United States Patent [19]
Sawai et al.

[11] Patent Number: 6,016,235
[45] Date of Patent: *Jan. 18, 2000

[54] TAPE RECORDER AND PLAY-BACK DEVICE HAVING UPPER AND LOWER RING GEARS

[75] Inventors: Kunio Sawai; Koji Morinaka; Masaaki Mitsuhashi, all of Daito, Japan

[73] Assignee: Funai Electric Company Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/372,977

[22] Filed: Jan. 17, 1995

[30] Foreign Application Priority Data

| Jan. 17, 1994 | [JP] | Japan | 6-000580 U |
| Jan. 17, 1994 | [JP] | Japan | 6-000582 U |
| Jan. 17, 1994 | [JP] | Japan | 6-000583 U |
| Jan. 17, 1994 | [JP] | Japan | 6-000584 U |
| Jan. 17, 1994 | [JP] | Japan | 6-000585 U |
| Jan. 17, 1994 | [JP] | Japan | 6-000586 U |
| Jan. 17, 1994 | [JP] | Japan | 6-000587 U |
| Jan. 17, 1994 | [JP] | Japan | 6-000588 U |
| Jan. 17, 1994 | [JP] | Japan | 6-000589 U |
| Jan. 31, 1994 | [JP] | Japan | 6-001170 U |

[51] Int. Cl.⁷ ............................................. G11B 15/665
[52] U.S. Cl. ........................................................ 360/85
[58] Field of Search ................................ 360/84, 85, 95

[56] References Cited

U.S. PATENT DOCUMENTS

| 4,620,245 | 10/1986 | Shimizu | 360/85 |
| 4,635,146 | 1/1987 | Koda et al. | 360/85 |
| 4,908,723 | 3/1990 | Ohyama et al. | 360/85 |
| 5,025,332 | 6/1991 | Tsuchida et al. | 360/95 |
| 5,103,356 | 4/1992 | Fujiwara et al. | 360/85 |
| 5,114,093 | 5/1992 | Kunimaru et al. | 360/96.3 |
| 5,151,832 | 9/1992 | Nagasawa | 360/85 |
| 5,365,386 | 11/1994 | Konishi et al. | 360/85 |
| 5,450,258 | 9/1995 | Kwon | 360/85 |

FOREIGN PATENT DOCUMENTS

| 52-060109 | 5/1977 | Japan . |
| 54-16726 | 6/1979 | Japan . |
| 54-164530 | 11/1979 | Japan . |
| 55-097054 | 7/1980 | Japan . |
| 55-174750 | 12/1980 | Japan . |
| 57-45008 | 3/1982 | Japan . |
| 61-5641 | 2/1986 | Japan . |
| 61-087256 | 5/1986 | Japan . |
| 61-31541 | 7/1986 | Japan . |
| 61-189442 | 11/1986 | Japan . |
| 62-028992 | 2/1987 | Japan . |
| 62-170060 | 7/1987 | Japan . |
| 62-142747 | 9/1987 | Japan . |
| 62-198546 | 12/1987 | Japan . |
| 63-109354 | 7/1988 | Japan . |
| 63-114434 | 7/1988 | Japan . |
| 63-157892 | 10/1988 | Japan . |
| 1-64125 | 4/1989 | Japan . |
| 2-260192 | 10/1990 | Japan . |
| 3-127366 | 5/1991 | Japan . |
| 3-20919 | 5/1991 | Japan . |
| 3-232183 | 10/1991 | Japan . |
| 3-106513 | 11/1991 | Japan . |
| 3-292602 | 12/1991 | Japan . |
| 5-089650 | 4/1993 | Japan . |

*Primary Examiner*—Brian E. Miller
*Attorney, Agent, or Firm*—Lackenbach Siegel Marzullo Aronson & Greenspan

[57] ABSTRACT

The video camera recording and/or play-back device according to this invention is constructed with plastic chassis and further provided with many mechanisms for assembling with case. This device is provided with two ring gears for guiding the tape to the revolving head cylinder, and a spaced portion penetrating the chassis in the vicinity of the location that the head cylinder is installed, the two ring gears are easily assembled by inserting the lower ring gear through the spaced portion and then placing the upper ring gear on the lower ring gear. In this device, at least one ring gear is made of plastic and provided with a mechanism preventing excess load to the ring gears.

3 Claims, 19 Drawing Sheets

F I G. 12
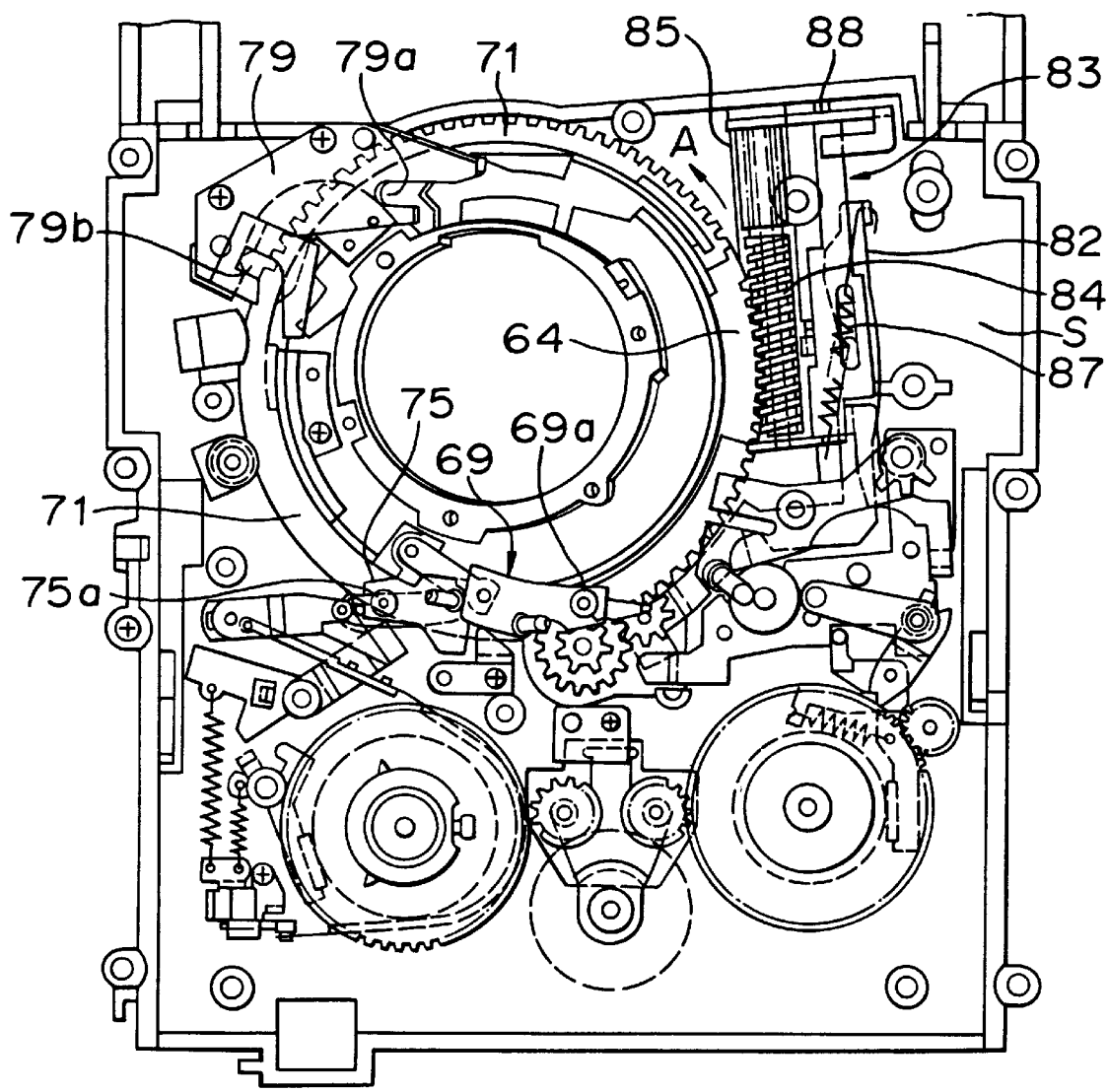

TAPE RECORDER AND PLAY-BACK DEVICE HAVING UPPER AND LOWER RING GEARS

BACKGROUND OF THE INVENTION

The present invention relates to a compact video camera recording and play-back device and, more particularly, it relates to a video camera recording and play-back device to which a camera is incorporated in one body (hereafter called a video camera recorder). Heretofore, the chassis of a conventional video camera recorder is made of metallic plates, in order to install printed circuit boards such as a main printed circuit board, a head amplifier printed circuit board and a camera printed circuit board onto the chassis, and an insulating member had to be placed between the chassis and the boards, and each board had to be electrically connected with flexible circuit boards. Printed circuit boards are hereafter referred to as "PCB".

The metallic chassis for the video camera recorder has brought many disadvantages to the camera recorder, requiring, for example considerable assembly time and production costs for extra parts. Furthermore, the extra parts make the video camera recorder heavier.

Another problem in the metallic chassis is that a rotary head cylinder is fixed to the chassis with screws through a cylinder installing base, and catchers which are positioning members of guide rollers at the bottom are also fixed to the chassis with screws, and the cylinder installing base and the catchers are independently fixed onto the chassis. The assembly work of the cylinder and guide rollers is troublesome, and often lacks accuracy.

Further, as is shown in FIG. 19, a ring gear 51 provided in this kind of a tape guide assembly was rotatably installed on the (not shown) chassis by applying three flanged guide rollers 52, for positioning against the engaging pinion 50 as to be parallel to the chassis (see the publication of examined patent application Showa 63-318672).

Further, as is shown in FIG. 20, the tape guide assembly 56 was connected to the horizontal ring gear 51 through a connecting member 89, and travelled along guide groove 46 on a sloped guide plate 47 while moving up and down along a circular arc, in accordance with the rotation of the ring gear 51. But in this construction, a plurality of flanged guide rollers 52 was required, and there was a further drawback in that connection of the tape guide assembly 56 to the ring gear 51 is very complicated.

Furthermore a mode changing switch of this kind of magnetic recording and play-back device was fixed on the chassis with small set screws and connected to the PCB with lead wires. Therefore, in this construction, as there are connecting parts between the mode changing switch and the PCB, there was a long-felt desire to decrease the number of parts, and to make the device smaller.

In the conventional device, for grounding the upper cylinder of the rotary head cylinder, the lower cylinder was fixed on the metallic chassis with several screws and the grounding between the upper cylinder and the static lower cylinder was provided together with grounding the upper cylinder by installing an earth-brush assembly. Therefore, when using a plastic chassis, as it becomes impossible to ground the rotary head cylinder, and too many extra parts were necessary for assembly.

In addition, the ring gear 51 which rotates the tape guide assembly along the tape guide rail for winding the tape around the periphery of the rotary head cylinder with a certain rounding angle was rotatably supported by three flanged guide rollers 52 as shown in FIG. 20. Therefore, in this construction, it was necessary to drill holes for installing the flanged guide rollers installation took a considerable time.

In this conventional magnetic recording and play-back device, in order to wind the tape around the rotary head cylinder with a certain angle, it was necessary to revolve a pair of tape guides while sliding along the rail guides, and to make the tape guides contact the catchers placed at the terminal points so that the tape guides are elastically pushed against the catchers. It also was required to bridge each spring against each upper ring gear and the lower ring gear, and to obtain the required contacting force by applying these the application of such springs. Accordingly, this construction not only forced a tape loading motor to bear excess loads for elastically pushing the guide rollers to the catchers, but required a considerable number of parts owing to the complex construction.

Furthermore, in the construction which elastically pushes the conventional pinch roller to a capstan roller, it was necessary to caulk bosses into the ring gears and to obtain the pushing forces of the pinch rollers against the capstan roller by revolving the lever with these bosses. By applying this construction, ring gears were forced to be loaded with considerable force towards rotational directions, even if ring gears were stopped while the video camera was used. Therefore, as the strength of ring gears was required to be large enough to bear the added forces, up to the present, ring gears made of metal were used.

Furthermore, in the compact video camera recording and play-back device which uses the conventional rotary head cylinder, the arm having an inclined post for guiding the tape was swung by a cam mechanism. Accordingly, it required considerable assembly time due to the complex construction for revolving the cam mechanism.

Furthermore, as the cassette holder of the conventional video camera had structural weak points corresponding to the gripping position in opening the holder, and opening and closing could not be performed smoothly, due to distortion or bending of the cassette holder itself. Especially in pushing only one side of the cassette holder, and there occurred the problem of not closing, due to the distortion of the cassette holder.

This invention was developed in consideration of the above-mentioned drawbacks, and the object thereof is to provide a compact video camera recording and play-back device which can be easily handled, has less parts, decreased weight, simplified assembly, and reduced manufacturing costs.

Further, the other object of this invention is to provide a video camera recording and play-back device which has high accuracy and high grade image quality, by integrating a revolving head installation base and lower positioning portions of the guide rollers into one piece.

Another object of this invention is to provide a video camera recording and play-back device having a simple construction, easy assembly and higher reliability, and also a long life.

Yet another object of this invention is to provide a new construction of the plastic cassette holder, provided with a synchronized shaft shaped in one piece with the cassette holder, and free of the above-mentioned drawbacks.

In order to attain the above objects, the video camera recording and play-back device according to this invention is characterized in that the chassis is made of plastic and the first PCB is assembled through the connecting members with the chassis.

Also, the device is characterized in that the second PCB is supported by the supporting members installed in one piece with a plastic chassis, together with the second PCB assembled on the aforementioned first PCB.

Furthermore, the device is characterized in that the first PCB and the second PCB are electrically connected with a connecting member.

The device is further characterized in that the plastic frame is molded in one piece with a plastic chassis, on which the rotary head cylinder with magnetic heads is installed.

The above-mentioned rotary head cylinder is constructed so as to be suited to the rotary head cylinder for the portable video camera. Accordingly, by providing this construction, it becomes possible for the device to be easily assembled in comparison to the conventional device, and possible to reduce the assembly work, further reducing the cost of parts due to the reduction in the numbers of parts, and finally to obtain a light-weight device.

Further, in the video camera recording and play-back device of the present invention the lower part of the guide rollers on the moving guide are supported by the supporting member installed on the chassis, the top head portion of the guide rollers is supported by upper guides, and the upper guide is provided with U-shaped notches for supporting the head portions of the guide rollers. Further, the chassis and the upper guides are separately molded, and each of them is made of plastic. By applying these constructions, the device has the following advantages. Namely, (1) it is possible to assemble the device with high accuracy and to obtain high grade vision, as the rotary head cylinder installing portion and the V-shaped portions for positioning the lower portion of the guide rollers are shaped in one piece with the chassis, (2) it is possible to reduce the number of parts, and to reduce assembly work, as the rotary head installation portion is shaped in one piece with the chassis.

Furthermore in the video camera recording and play-back device of this invention, tape gear assemblies which are connected with an upper ring gear and a lower ring gear, are driven by the rotation of said upper and lower ring gears, a rib along the internal periphery of the lower ring gear being built on the chassis in one piece with the chassis, and another rib along the internal periphery of the upper ring gear being built on the lower ring gear in one piece with the lower ring gear. This device has the lower ring gear slantingly installed on the flat surface of the chassis, a link mounted on the lower ring gear, and a tape guide assembly pivotably installed on the tip portion of the link. The pin hole of the link mounted on the lower ring gear is the shape of a long hole. Further, it is preferable that one of the upper ring gears or the lower gear be made of plastic, as well as the plastic chassis. The ribs are formed in circular arcs. By applying these constructions, the device has the following advantages. Namely, (1) as there is no need to provide a plurality of flanged guide rollers around the internal periphery of the ring gear as provided in the conventional device, it becomes possible to reduce the number of parts; and (2) as two ring gears are installed so as to incline in the same direction as the running direction of the tape guide assembly and with the inclination of the assembly in set-up condition, then the tape guide assembly is able to follow the revolution of the ring gear within the play range of the engaging portion, therefore making it possible to reduce the number of parts and assembly work owing to a more simple construction than that of the conventional device.

Furthermore, in the video camera recording and play-back device of the present invention, the mode changing switch for changing the working mode of the device is directly installed on the PCB, and the switch is driven by the motor through a gear mechanism. By applying these constructions, as the connecting parts installed between the mode changing switch and the PCB are able to be eliminated, it becomes possible to reduce the cost of parts and assembly time for assembling the connecting parts, and consequently, this device has the advantage of increasing productivity.

Furthermore, in a video camera recording and play-back device according to the present invention, an elastic metal chip contacted to the axis of the rotary head cylinder is connected to the grounding circuit installed on the PCB through connecting members. Also, the metal chip and the connecting members are built in one piece, and the connecting members are made of aluminum. Further, the rotary upper cylinder and the fixed lower cylinder are electrically conducted through the metal chip and the connecting members, and the connecting members are fixed on the chassis which is made of plastic. By applying these constructions, the device has the following advantages:

(1) it is possible to securely ground the revolving head cylinder by using simple construction, and (2) as the earth brush assembly is fixed together with the lower cylinder, it reduces the fastening steps.

Furthermore, the video camera recording and play-back device of the present invention is provided with a pair of ring gears for driving the tape guide assemblies which guide a tape on to the rotary head cylinder, and at the vicinity of the specified portion where the rotary head cylinder is installed, a hollow space penetrating through the chassis is provided, and the hollow space is located in between the positioning place of the tape guide and the ribbed portions supporting the base portions of the tape guide assemblies. Also, one of the two ring gears is partly mounted under the ribbed portion behind said hollow space and another ring gear is mounted on the ribbed portion above the hollow space. By applying these constructions, it becomes possible to install the lower ring gear, by inserting one portion of the gear into the space, and then throwing down toward the opposite direction, therefore becoming possible to eliminate the flanged guide rollers used in that conventional device, and to further realize a reduction in the number of parts and assembly work.

Furthermore, in a video camera recording and play-back device which revolves an upper ring gear and a lower ring gear, and drives each of the tape guide assemblies incorporated in ring gears, the video camera recorder and play-back device of this invention is provided with an elastic member which energizes the upper ring gear and the lower ring gear in opposite directions from each other, a worm gear engaged to the lower ring gear is supported by a first sliding plate, a gear engaged to the upper ring gear is installed on a second sliding plate, and the first and second sliding plates are bridged by the biasing elastic member.

On the second sliding plate, the first gear engaged to the lower ring gear, the second gear engaged to the first gear and the third gear assembled coaxially and in one piece with the second gear are installed, and the second gear revolves more slowly than the first gear. Also, on another end of the second sliding plate, the elastic member composed with a tension spring is bridged. Then, when the worm gear moves forward, as the tension spring bridged between the first sliding plate and the second sliding plate is extended, there is generated the rotating force acting towards the opposite direction between the lower ring gear engaged with the worm gear and the upper ring gear engaged with the gear installed on the second sliding plate. Accordingly, the guide rollers on the upper and lower tape guides fixed to each of the upper and lower ring gears are pressed to the catcher under the energized state. Therefore, the tape is wound around the revolving head cylinder with specified contact angle.

By application of the above construction, the following advantages are obtainable:

(1) As it is possible to elastically push the guide roller of the lower tape guide assembly and the guide roller of the upper tape guide assembly against the catcher by applying only one tension spring, the load required for the tape loading motor is reduced. Especially in case of application of this construction to video cameras, it becomes possible to extend the life of batteries.

(2) As it is possible to bias both the upper ring gear and the lower ring gear by applying only one tension spring, it becomes possible to simplify construction, and to decrease the number of parts.

Further, the video camera recorder and play-back device according to this invention comprises with:

ring gears driving tape guide assemblies, a worm gear engaged with one of the ring gears, and driven by a motor, a slide plate supporting the worm gear, and having an inclined portion, the first revolving plate having a stopper, a roller installed on the first revolving plate, and contacting to the inclined portion of the slide plate, the second revolving plate revolving around the axis of the first revolving plate, and contacting to the stopper at the one end of the plate, a pinch roller rotatably installed on the second revolving plate, an elastic member bridged between the first revolving plate and the second revolving plate, and furthermore, the sliding plate lets the first revolving plate revolve by moving itself and a straight line, and one of the ring gears is made of plastic.

Accordingly, the roller installed on the first revolving plate elastically pushes the pinch roller against the capstan, pushes the pinch roller against the capstan, by applying the inclined portion of the slide plate, but in this case, the reaction force of the pinch roller is not transferred to the worm.

Accordingly, as the ring gear does not receive an excessive load, it maintains high reliability and a long life.

According to this invention, it is clear that this device has the following advantages:

(1) In this construction, as the pinch roller is pushed against the capstan through the transferring roller while being pressed by the inclined portion of the sliding plate, the reaction force of the pinch roller directly is not added to the worm gear. As the direct reaction force does not effect the lower ring gear, it becomes possible to prevent deformation of the ring gear.

(2) Because of the reason described in (1), as the strength of the ring gear is perhaps not strong, it becomes possible to make the ring gear from resin such as plastic, to economize expenses. By employing a plastic ring gear, it is also possible to decrease the weight.

Further, in a video camera recorder and play-back device which revolves an upper ring gear and a lower ring gear and drives each of the tape guide assemblies incorporated in the ring gears, the video camera recorder and play back device according to this invention is provided with:

a rib shaped on the upper ring gear;

the first arm member revolving while being engaged with each end of the rib of the upper ring gear when loading and unloading the tape, a revolving plate co-revolving with the first arm member in one piece, and having a gear integrated in one piece, the second arm member having an inclined post and one gear engaged with the aforementioned gear of the revolving plate, and further on the first arm member two engaging portions engaged to the rib, and the rib shaped as a concentric circular arc-shape to the upper ring gear.

Accordingly, when the upper ring gear rotates loading direction or unloading directions, the first arm member engaging to the rib revolves, then the revolving plate fixed to the axis of the arm member also revolves, then the gear fixed to the revolving plate also revolves, successively the second arm member having an indicated post and engaging to the gear also revolves, and accordingly the inclined post swings to the specified position, then the tape is guided as specified.

Furthermore, the cassette holder according to this invention is constructed to form a pair of door hinge portions by elongating both side walls of the holder, and a synchronous shaft is mounted between both door hinge portions, and is constricted so as to be rotatable around the synchronous shaft.

Also, at another end of the cassette holder, a cassette housing room is formed, and a pair of elastic members are installed in the synchronous shaft for biasing the cassette holder to open, and the cassette holder is made of resin such as plastic.

Accordingly, the cassette holder according to this invention is constructed so as not to produce strains, and is provided with the advantage of preventing malfunctions, for example, it readily works even when one side of the holder is pushed and strained.

BRIEF DESCRIPTION OF THE DRAWINGS

FIG. 11 is an earth-brush assembly according to one embodiment of this invention.

FIG. 12 is a plan view showing miscellaneous parts according to one embodiment of this invention installed on the chassis.

DETAILED DESCRIPTION OF THE INVENTION

Figure 1:
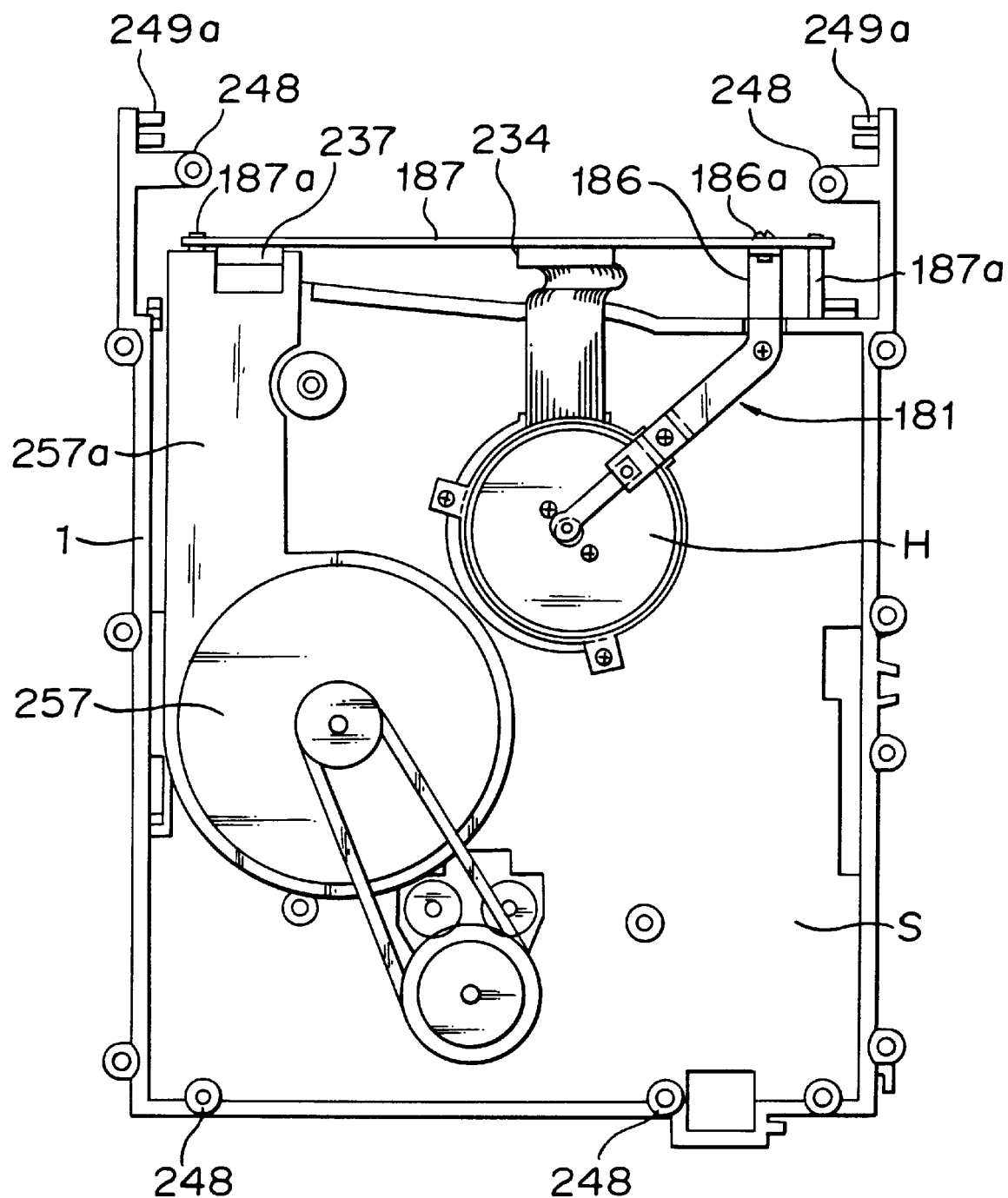
FIG. 1 is a bottom plan view of a chassis made of resin such as plastic provided with the parts shown in one embodiment according to the present invention.

The first embodiment according to this invention is described in detail with reference to FIG. 1 to FIG. 4 as follows.

In these drawings, numeral 1 is a chassis made of plastic (hereafter called the chassis), numeral 240 is a main printed circuit board equivalent to the first printed circuit board assembling the chassis 1 (hereafter the printed circuit board is called PCB), numeral 187 is a head amplifier PCB equivalent to the second PCB, numeral 249 is a camera PCB for camera K and also known as the second PCB.

Figure 2:
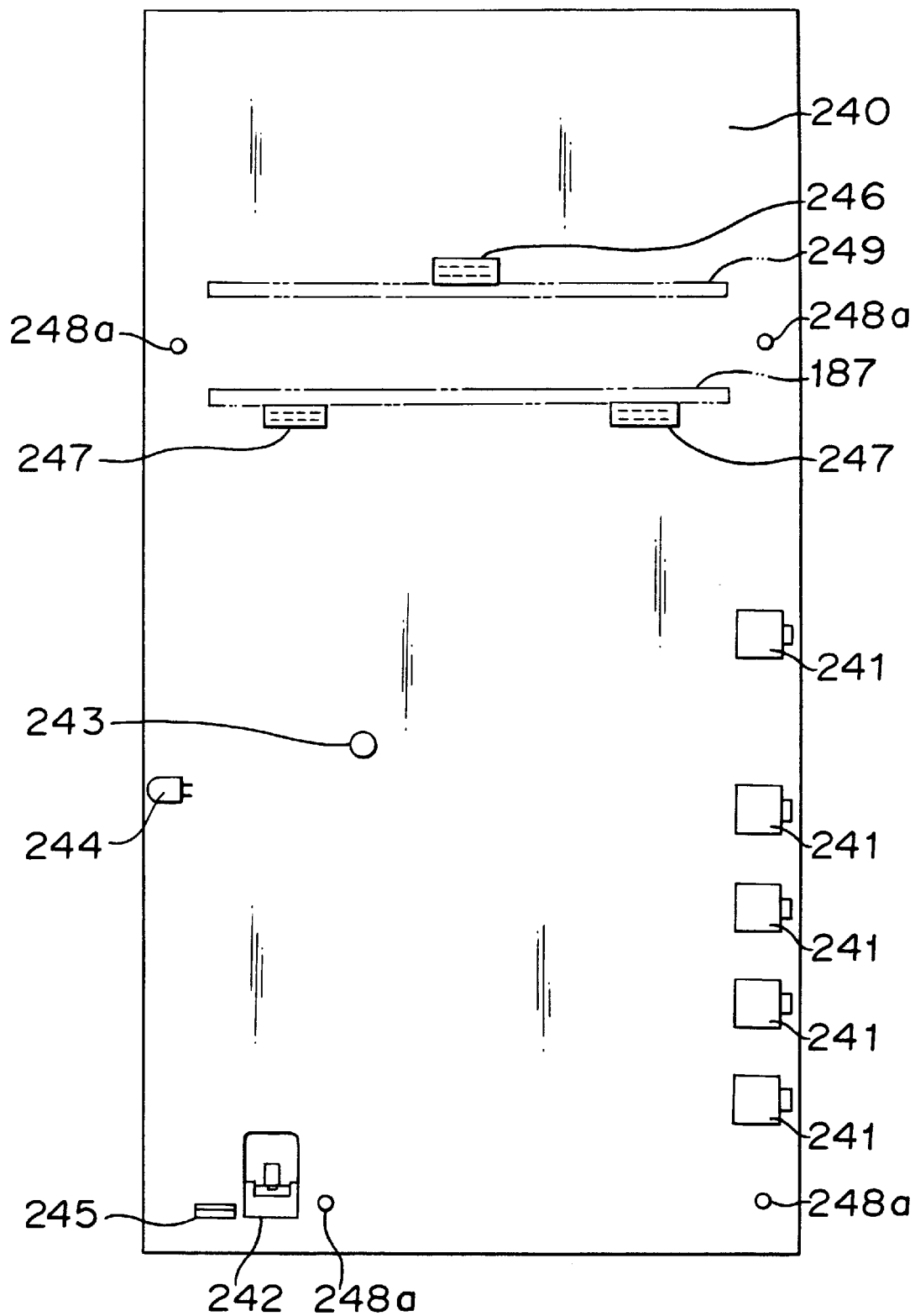
FIG. 2 is a plan view of the main PCB showing one embodiment according to the present invention.
Figure 3:
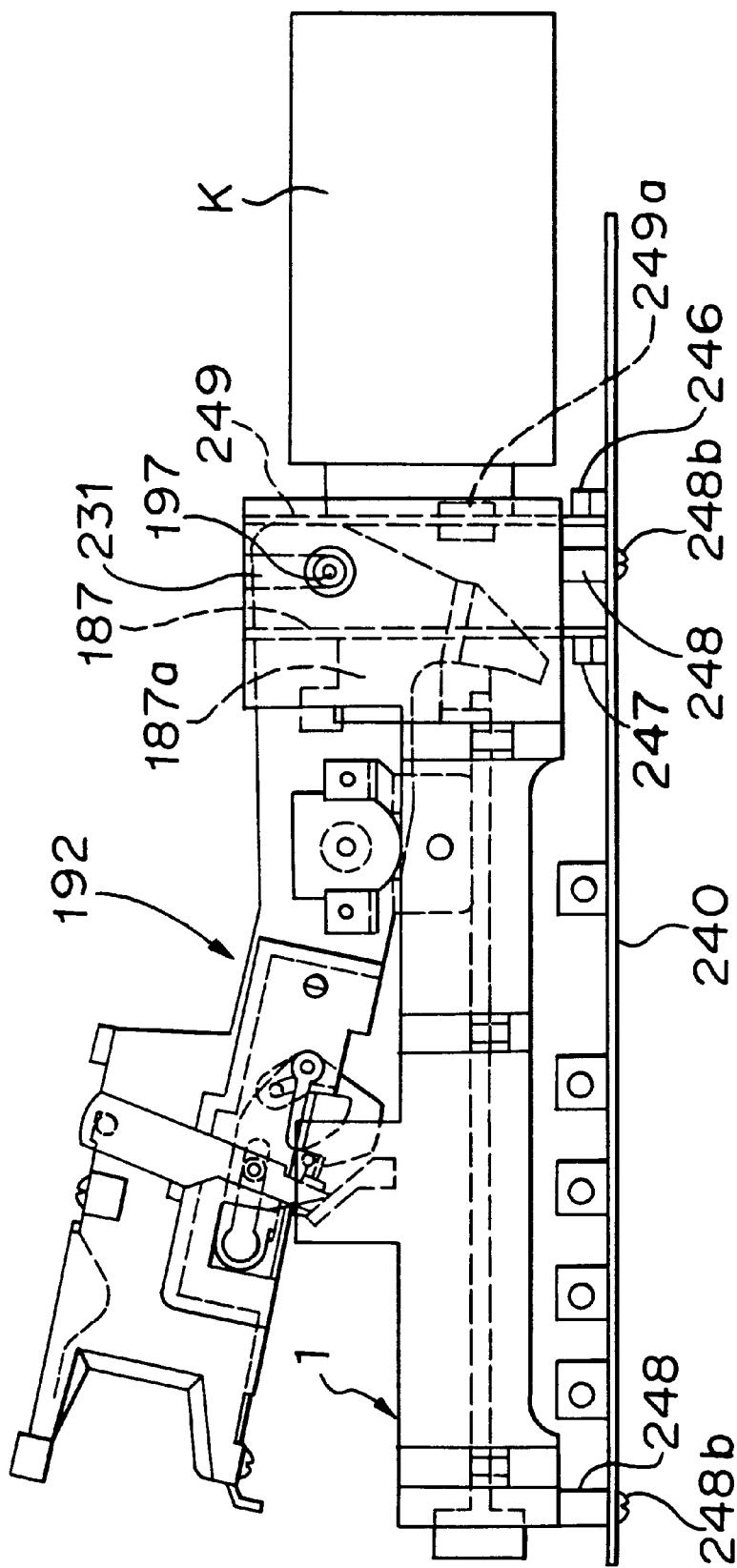
FIG. 3 is a side elevational view showing the main PCB installed under the chassis made of resin such as plastic, in which a cassette holder according to one embodiment of this invention is installed.

As shown in FIG. 1 and FIG. 3, there are four bosses 248 for installing the main PCB 240 on the under surface of the chassis 1, and the main PCB 240 is securely installed under bosses 248 with small screws 248b through holes 248a (shown in FIG. 2).

Furthermore, as a pair of two engaging pieces 187a equivalent to stud ribs for receiving the head amplifier PCB 187 are provided in the chassis 1, then the head amplifier PCB 187 is inserted in engaging pieces 187a, and simultaneously, a connector of the head amplifier PCB 187 is downwardly inserted into a connector 247 located on the main PCB 240. Also a tip of an earth-brush assembly 181 for grounding a revolving head cylinder H provided with magnetic heads is fixed to the head amplifier PCB 187 with set screws 186a, and a connector 237 installed on the elongated portion of a capstan motor PCB 257 installing a capstan motor 257, is inserted into the head amplifier PCB 187 (see FIG. 1 and FIG. 3).

Further, as shown in FIG. 1 and FIG. 3, a pair of guide ribs 249a are installed on the chassis 1, and a camera PCB 249 guided by the guide ribs 249a is inserted into a connector 246 of the main PCB 240 and is connected with the main PCB 240.

In this specification, aforementioned bosses 248, engaging pieces 187a and guide ribs 249a are generally called stud ribs.

As shown in FIG. 2, a plurality of control switches 241, a REC switch 242, a luminescent diode 243, a light receiving sensor 244, and a DEW sensor 245 are installed on the main PCB 240, and specified electrical circuits are composed.

Figure 4:
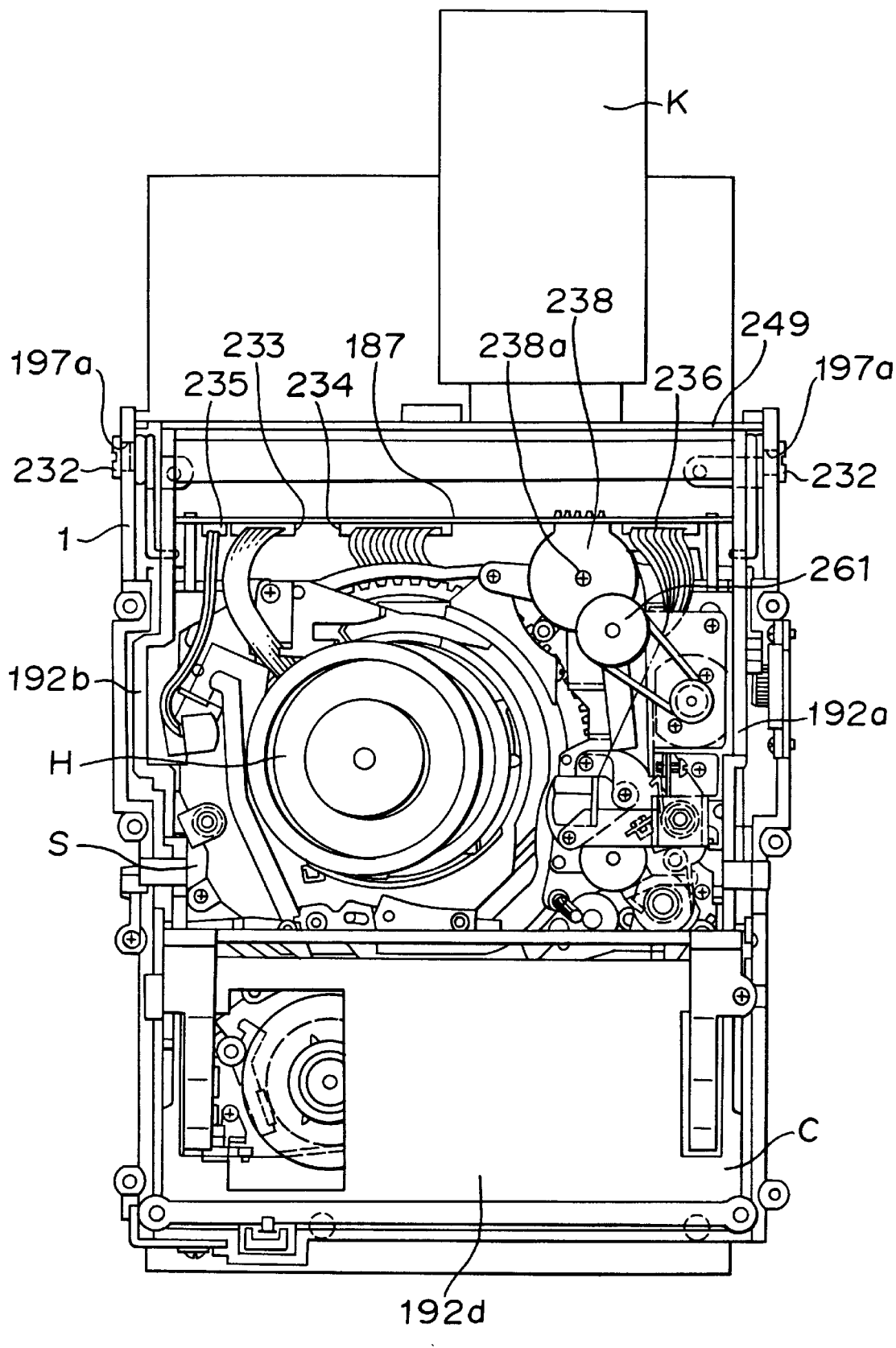
FIG. 4 is a plan view showing a main PCB, a head amplify PCB and a camera PCB installed on the chassis made of resin such as plastic, provided with parts shown in one of embodiments according to this invention.

For installing the head amplifier PCB 187, the camera PCB 249 and the main PCB on the chassis 1, at first, the chassis 1 is installed on the main PCB 240, then, as shown in FIG. 4, a connector 233 for a video head, a connector 234 for a cylinder motor, a connector 235 for an erasing head, a connector 236 for ACE head, a connector 237 for the capstan motor are installed on the head amplifier PCB 187, then a mode-changing switch 238 is installed, and a connection of the head amplifier PCB 187 is inserted into connectors 247 of the main PCB 240.

Then, the head amplifier PCB 187 is inserted into the engaging pieces 187a equivalent to the stud ribs installed on both sides of the chassis 1, further, together with fixing the end portion of the earth-brush assembly 181 to the head amplifier PCB 187 with small set screws 186a, a connector 237 for a capstan motor is inserted, and the mode changing switch 238 is installed on a motor holder (not shown) by applying a stepped screw 238a loosely engaged with a rotational center hole of the mode changing switch 238.

Next, with inserting a connector of the camera PCB 249 into the connector 246 of the main PCB 240 along the guide ribs 249a, the assembling work is finished.

Also, a chassis S assembled with the revolving head cylinder H may be shaped in one piece with the chassis 1, or may be shaped independently.

Furthermore, although the main PCB 240 is fixed to the chassis 1 by applying set screws 248b in this embodiment, it may be possible to fix by applying some other connecting member, for example, rivets.

Also, in this embodiment, as the head amplifier PCB 187 is supported by the engaging pieces 187a and the camera PCB 249 is also supported by the guide ribs 249a, it may be possible to apply another construction, as far as such supporting mechanisms are composed.

Also, this embodiment describes an example adapted to a portable video camera of the present invention, however, this invention is widely adaptable to video tape recorders, video players or other audio video apparatuses.

The second embodiment according to this invention is described in detail with reference to FIG. 5 and FIG. 6 as follows.

Figure 5:
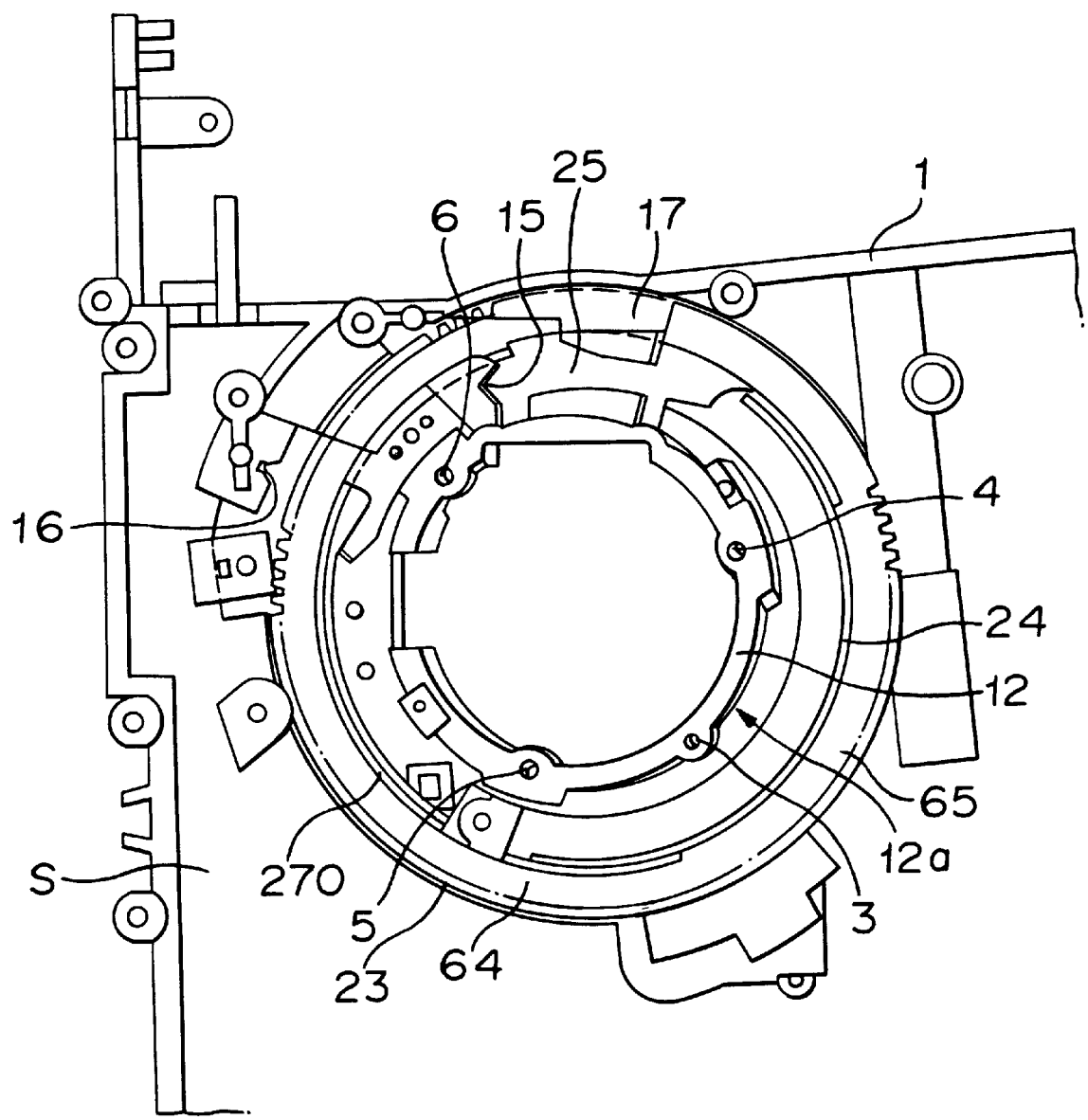
FIG. 5 is a plan view showing a lower ring gear installed above the chassis shown in one embodiment according to this invention.
Figure 6:
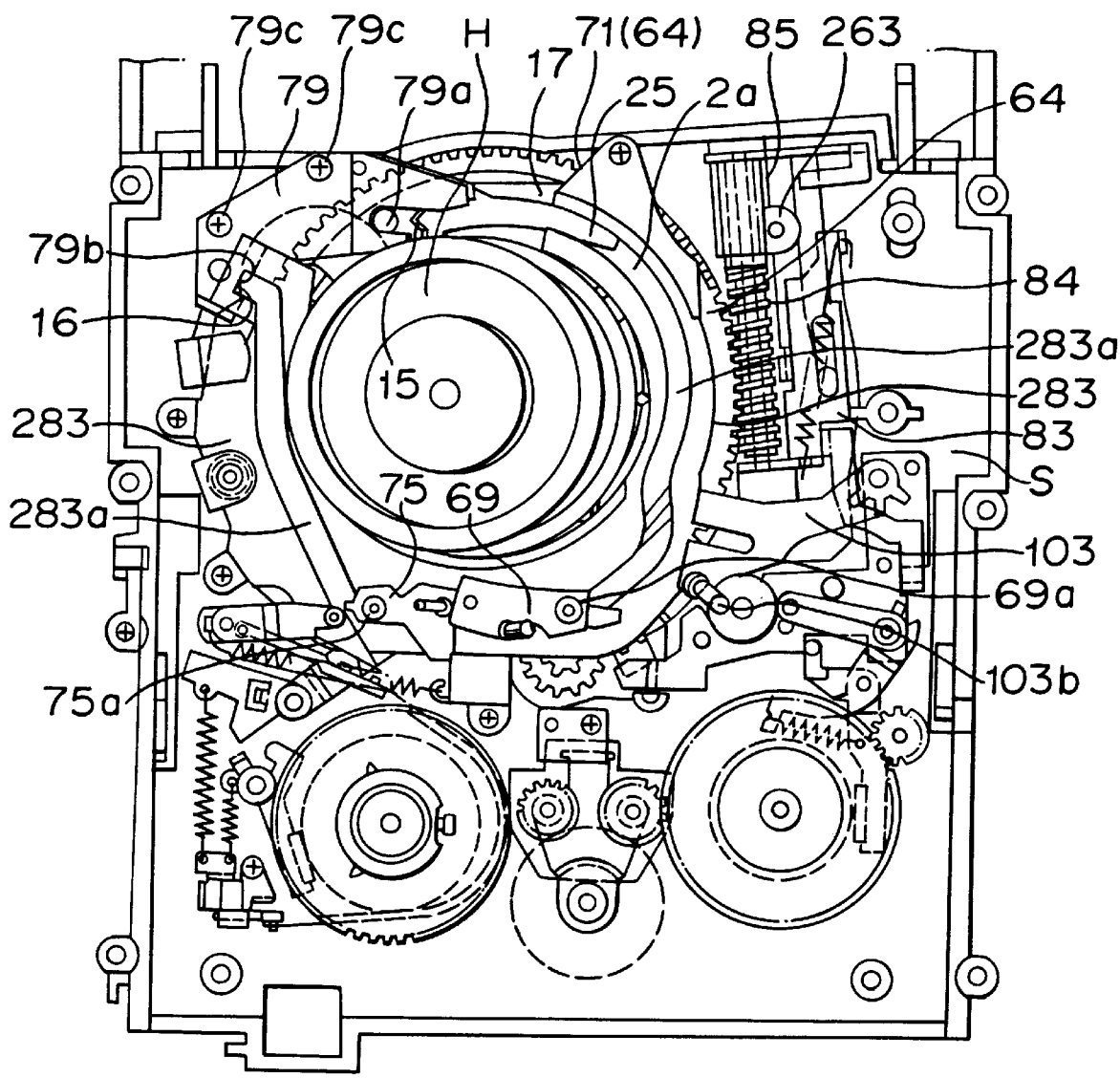
FIG. 6 is a plan view showing miscellaneous parts installed in the chassis according to one embodiment of this invention.

FIG. 5 is a plan view of the lower ring gear installed on the chassis according to the embodiment on this invention, and FIG. 6 is a plan view of the miscellaneous parts installed on the chassis.

In FIG. 5, numeral S is a chassis, and is made of resin such as plastic (for example, PPS resin) in this embodiment. Numeral 12a is an installing portion of the revolving head cylinder H, provided with thread screw holes 4, 5 and 6 for installing the revolving head cylinder H and a knock hole 3 for positioning the cylinder H, and has a ring-shaped surface 12 inclined as much as specified.

Numerals 15 and 16 are V-shape portions shaped in one piece with the chassis S for supporting tape guide rollers, and support the lower portions of the tape guide rollers 69a and 75a installed on tape guide assemblies 69 and 75.

Numeral 79 shown in FIG. 6 is an upper guide made of resin such as plastic, and installed in the specified height above aforementioned pair of V-shape portions 15 and 16, and together with separately supporting the head portions of the guide rollers 69a and 75a, U-shaped cut edges 79a and 79b for receiving the guide rollers are superlatively shaped at both ends, and fixed on the chassis S with set screws 79c, 79c.

As shown in FIG. 5, the revolving head cylinder H is installed on the aforementioned installation surface 12a with (not shown) three set screws through the threaded holes 4, 5 and 6, and is positioned on the ring-shaped surface 12 inclined as much as specified. Numeral 3 is a knock hole for positioning the cylinder H.

As shown in FIG. 6, numerals 283, 283 are guide rails installed on the chassis S and made of resin such as plastic, for guiding the tape guide assemblies 69 and 75, and numerals 283a, 283a are guide grooves shaped on guide rails 283, 283.

Each of the guide rollers 69a and 75a installed independently on the tape guide assemblies 69 and 75 are transferred clockwise and counterclockwise along each of the guide grooves 283a while driven by each of the ring gears 64 and 71, and upwardly wind the tape around the revolving head cylinder H, and stop at the end points of guide grooves 283a, 283a.

In this case, the guide roller 69a is supported by the V-shape portion 15 and the output 79a in the specified position, also the guide roller 75 is supported by the V-shape portion 16 and the cutout 79b in the specified position. By applying this construction in the specified positions, it becomes possible to accurately wind the tape around the revolving head cylinder 179, and to obtain high grade visions.

The third embodiment according to this invention is next described in detail with reference to FIG. 5 to FIG. 8 about the case that this invention is applied to a video camera.

Figure 7:
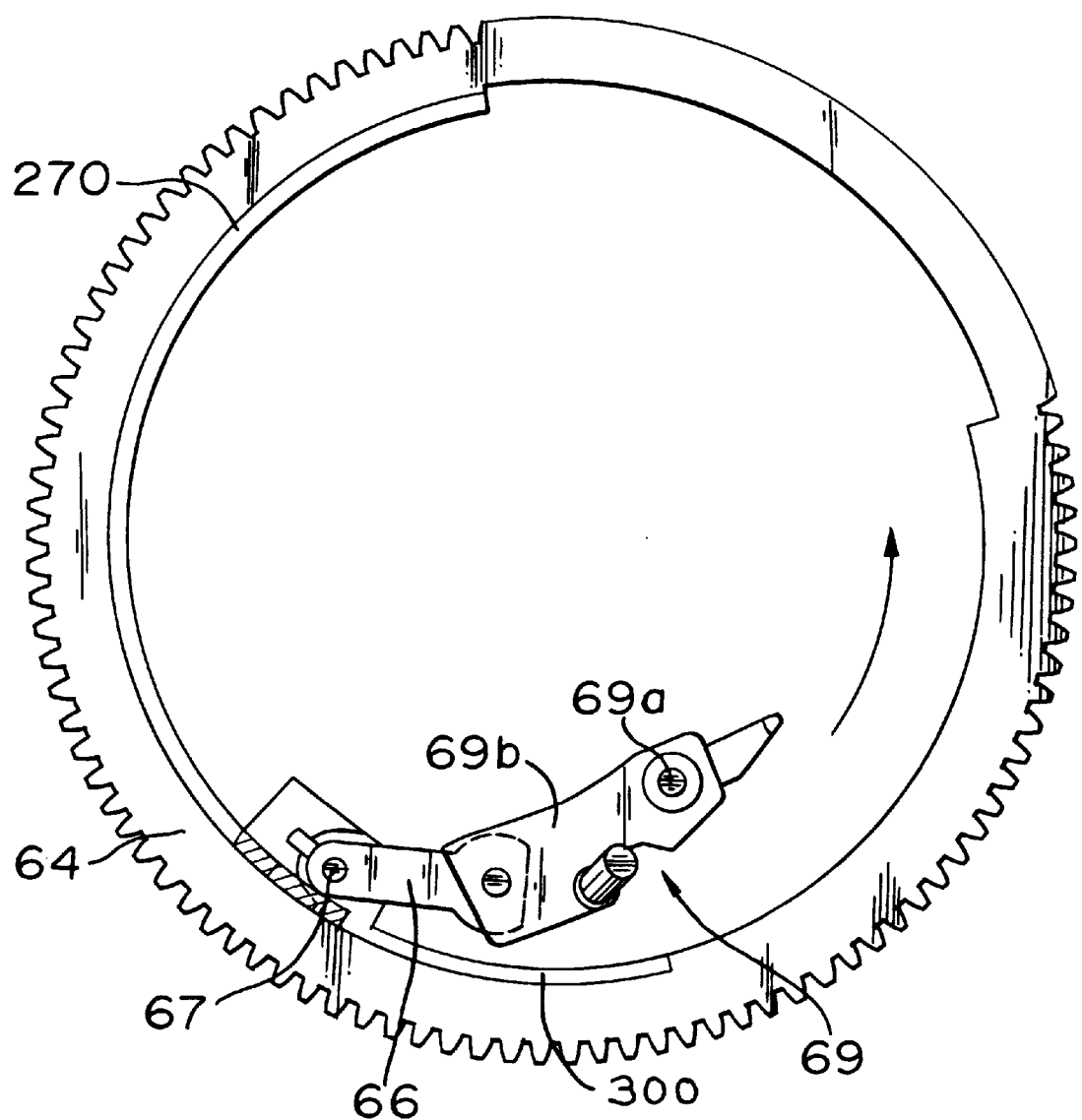
FIG. 7 is a plan view of the lower ring gear according to one embodiment of this invention.
Figure 8:
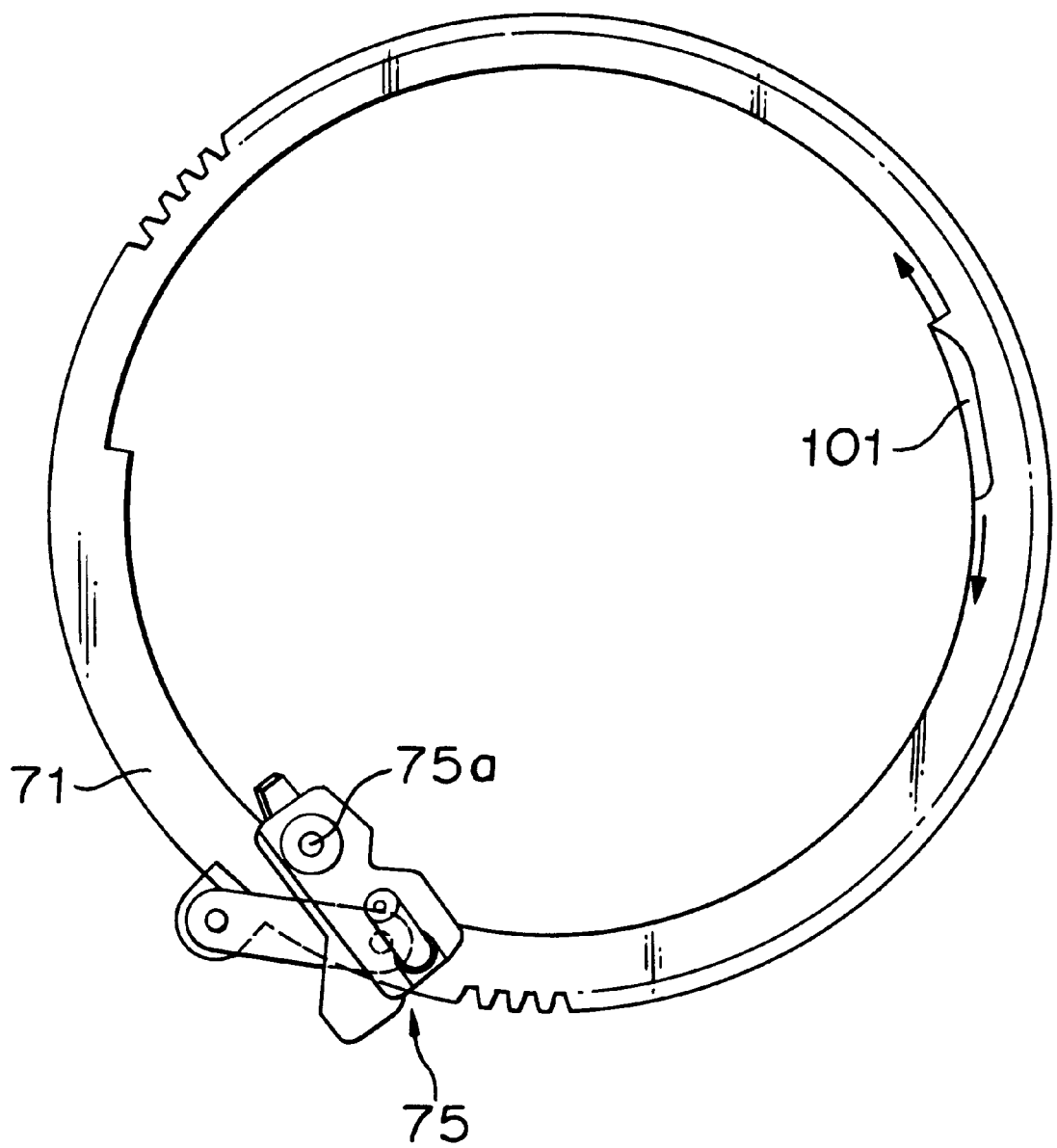
FIG. 8 is a plan view of the upper ring gear according to one embodiment of this invention.

FIG. 5 is a plan view of the chassis which installed the ring gear, and a ring gear installing portion formed in one piece with the chassis so as being a concavity inclined as much as specified angle against the bottom surface of the chassis S, and the lower ring gear 64 shown in FIG. 7 is installed on the inclined installing portion, and further the upper ring gear 71 shown in FIG. 8 is installed on the lower ring gear 64. Further, each of the tape guide assemblies 69 and 75 is connected separately to the lower ring gear 64 and to the upper ring gear 71 through each of the links.

When the lower ring gear 64 rotates counterclockwise and the higher ring gear 71 rotates clockwise, each of the tape guide assemblies 69 and 75 is transferred along the guide grooves 283a, 283a, and the tape guided by the guide rollers 69a and 75a is wound around the specified portion of the revolving head cylinder H.

Further, in this embodiment, the chassis S is provided with a construction enabling easy reception of the lower ring gear 64 and the upper ring gear 71. Namely, as shown in FIG. 5, circular ribs 24, 24 are shaped in one piece with the chassis S for guiding the lower ring gear 64, at the peripheral edge of the ring gear installing portion of the chassis S, and as shown in FIG. 5 and FIG. 7, circular ribs 270 shaped along the internal periphery of the lower ring gear 64 (shown in FIGS. 5 and 7) are shaped in one piece with the lower ring gear 64, along the internal periphery of the lower gear 64. The aforementioned chassis S, and upper and lower ring gears 71 and 64 may be made of metal, but it is preferable that they be made of resin such as plastic, because the chassis and gears made of resin have not only less friction and slide better, but it is also preferable to shape the ring gear installing portion and the ribs 24 in one piece with the chassis S.

The lower ring gear 64 is inclined towards chassis S and two pairs of the upper ring gear 71 are installed on the chassis S.

As shown in FIG. 7, the link 66 is pivoted on the inner side of the lower ring gear 64, and the tape guide assembly 69 is rotatably pivoted on the tip of the link 66. Further, the pin 67 of the link 66 pivoted to the lower ring gear 64 is loosely engaged with the long hole 300 shaped on the lower ring gear 64. Accordingly, the tape guide assembly 69 is securely guided along the guide groove 283a, in rotating the lower ring gear 64.

Further, each of the lower ring gear 64 and the upper ring gear 71 is engaged with a different pinion (not shown) and rotates towards the opposite direction while driven by the motor (not shown).

The magnetic recording and/or regenerating device according to this invention drives the upper ring gear and the lower ring gear; and drives each of the tape guide assemblies engaged with each of the ring gears, and is characterized in that, the arc-shaped rib 24 along the internal periphery of the lower ring gear 64 are provided on the chassis S and suitably integrally formed therewith, and the arc-shaped rib 270 along the internal periphery of the lower ring gear 64 is suitably fabricated in one piece with the lower ring gear.

Further, this device is characterized by the lower ring gear installed as inclined to the horizontal chassis surface, the link pivoted to the lower ring gear, and the tape guide assembly rotatably pivoted on the tip of the link, and the long pin installed in the lower ring gear for receiving the pin of the link.

Also, this device is characterized in that any one of the upper and lower gears is made of resin such as plastic.

Also, this device is characterized in that the aforementioned rib is shaped so as being in a circular arc.

Furthermore, this device is characterized in that the aforementioned chassis is made of resin such as plastic.

Next, the fourth embodiment relates to the installation construction of the mode changing switch described in detail with reference to FIG. 9 and FIG. 10 as follows.

Figure 9:
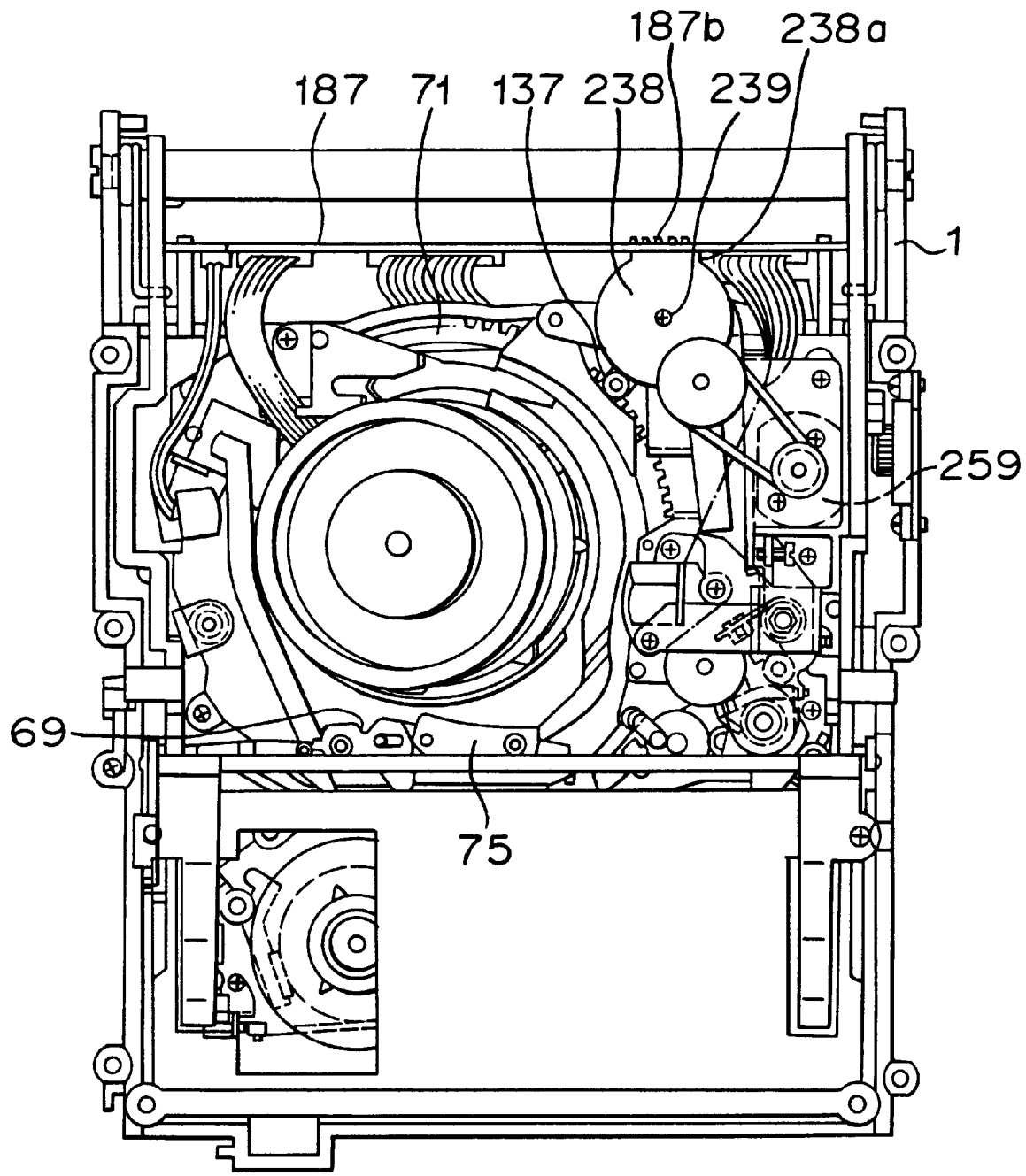
FIG. 9 is a plan view showing miscellaneous parts installed in the chassis according to one embodiment of this invention.
Figure 10:
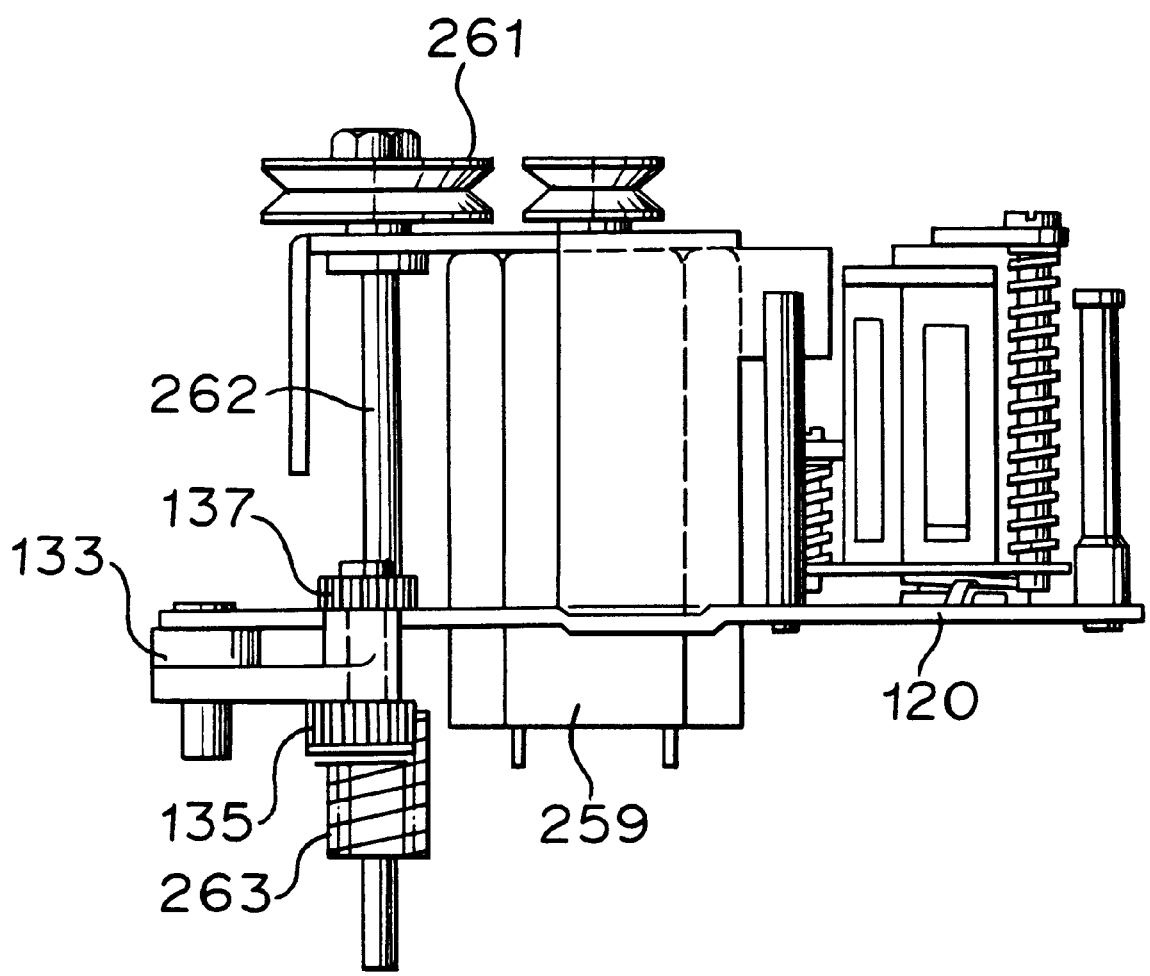
FIG. 10 is a side elevational view showing the essential parts according to one embodiment of this invention.

FIG. 9 is a plan view of miscellaneous parts installed on the chassis of the video camera, and FIG. 10 is a side elevation view of the essential parts. Numeral 238 is the mode changing switch, numeral 238a is a boss for installing the switch 238, numeral 137 is a gear for driving the switch 238, and numeral 187 is the head amplifier PCB.

The boss 238a is installed at the side surface of the switch 238, and the side surface of the switch 238 is installed on the head amplifier PCB 187 so as to be closely contacted. A plural of terminals extruded from the side surface are soldered to the head amplifier PCB 187 via through holes.

By adopting this construction, the mode changing switch 238 is firmly fixed to the head amplifier PCB 187.

The soldering 187b are soldered to the circuit of the head amplifier PCB 187.

As shown in FIG. 9 and FIG. 10, the driving gear 137 is engaged with the gear (not shown) of the mode changing switch 238.

An intermittent gear 135 is coaxially installed under the driving gear 137, and the intermittent gear 135 is engaged with the upper ring gear 71 shown in FIG. 8.

Further, the driving force of the motor 259 is transmitted to the shaft 262 via a couple of pulleys 261, then via a gear 263 coaxially installed in the shaft 262 and gear trains (not shown in FIG. 9) the lower ring gear 64 installed under the upper ring gear 71 is driven, and the upper ring gear 71 is driven via other gear trains.

By the rotation of the intermediate gear 135 engaged to the upper ring gear 71, the driving gear 137 drives the mode changing switch 238, and the recording, regenerating and stopping modes are selected by the rotation of the switch 238.

Herein, the fifth embodiment relating to the installation construction of the earth-brush assembly grounding the cylinder axle of the revolving head cylinder is described in detail with reference to FIG. 11 as follows.

In FIG. 11, numeral 180 is a drum motor shield plate which constitutes a part of a lower cylinder of the revolving head cylinder H, numeral 183 is a cylinder axis of the revolving head cylinder H, numeral 181 is the earth-brush assembly composed with a metallic brush 182 and a connecting sheet member 181a made of aluminum, and numeral 187 is the head amplifier PCB.

Figure 11A:
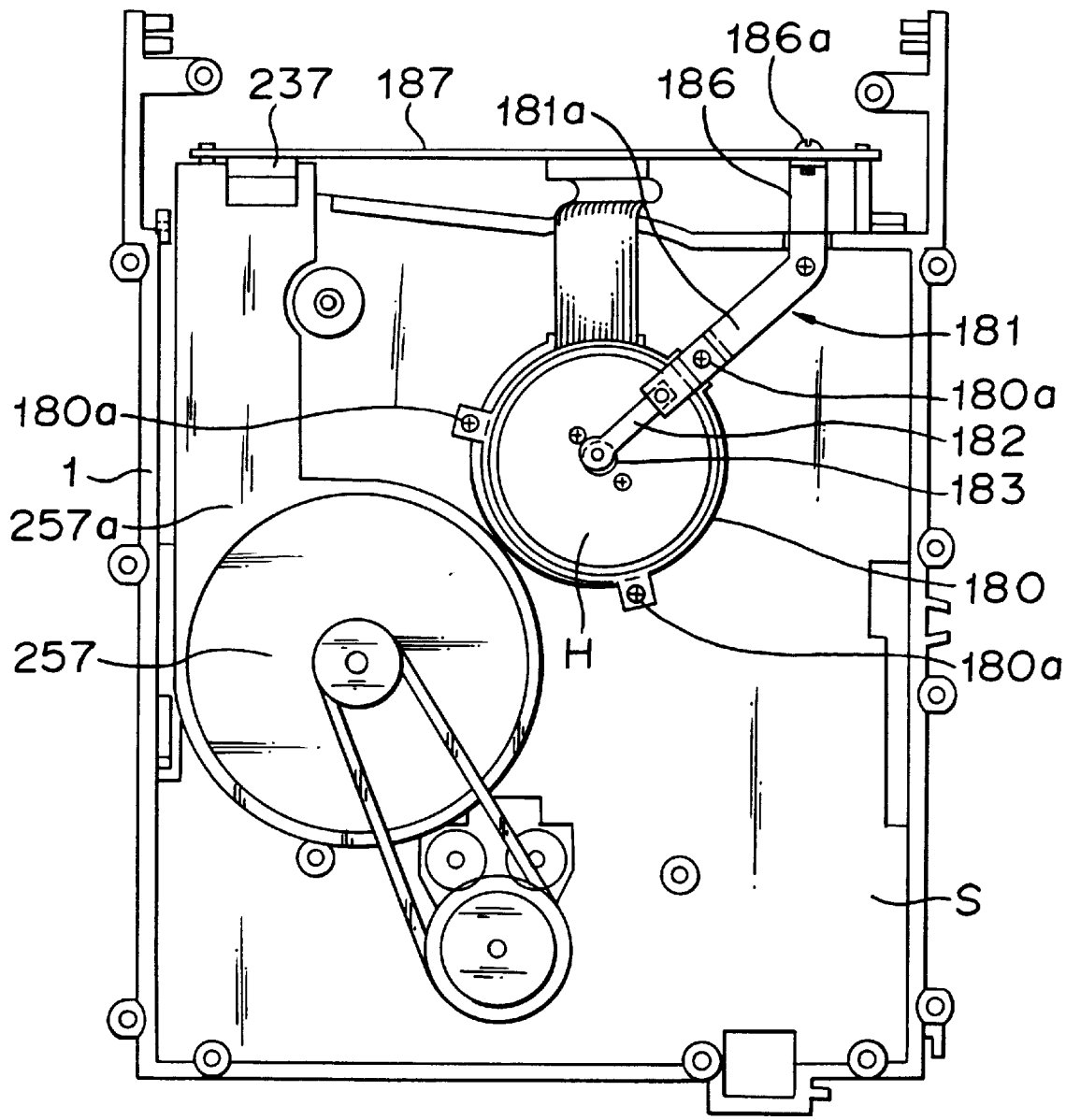
FIG. 11(a) shows a bottom plan view of the chassis provided with the earth-brush assembly.
Figure 11B:
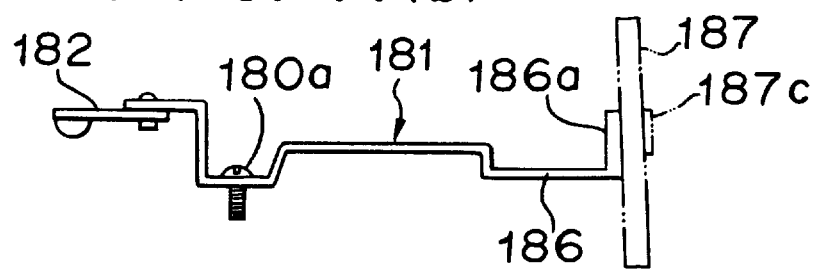
FIG. 11(b) shows a side elevational view of the earth-brush assembly.

FIG. 11(a) shows the bottom surface of the chassis S made of resin such as plastic, and FIG. 11(b) shows the side elevation of the earth-brush assembly 181, and the revolving head cylinder H is installed on the ring-shaped surface of the chassis, inclined as much as specified angles, and fixed to the chassis S with three small thread screws 180a. One of the screws is used to fix the earth-brush assembly 181 together with the drum motor shield plate 180 of the lower cylinder.

As the earth-brush assembly 181 is fixed to the revolving head cylinder H by using the small thread screw 180a, then an elastic brush 182 contacts to the cylinder axis 183.

As the cylinder axis 183 is tightly inserted in (not shown) an upper cylinder, then the upper cylinder is electrically connected to the earth-brush assembly.

The opposite end of the brush 182, made of extended aluminum of the earth-brush assembly 181 extrudes from the rear side of the chassis S and is connected to earth circuit 187c on the head amplifier PCB 187 with a small set screw 186a.

By the above described construction, both the upper cylinder and the lower cylinder are electrically connected to the ground circuit 187c on the head amplifier PCB 187 via the earth-brush assembly 187.

As shown in FIG. 11(a), not only the end portion 186 of the earth-brush assembly 181 but the ground circuit of the capstan PCB 257a combined with the capstan motor 257 is also connected to the head amplifier PCB 187 via a connector 237.

Also, in this embodiment, the earth-brush assembly 181 is comprised with the brush 182 and aluminum, but it may be possible to shape the assembly 181 in one piece.

The sixth embodiment according to this invention is next described in detail with reference to FIG. 5 to FIG. 8 as follows.

In FIG. 5, there is a hollow-like space 25 penetrating the chassis S in the vicinity of the portion 12 for installing the revolving head cylinder H. Numerals 4, 5 and 6 are threaded holes for installing the head cylinder H.

The space 35 exists between a position defining point 15 for the tape guide and a ribbed portion 17 for receiving the base portion 69b of the tape guide assembly 69 at the terminal point of revolution.

A rib 24 shaped in the chassis S is constructed so as to contact with the inner edge of the lower ring gear 64, and the lower gear 64 rotates concentrically.

Also, numeral 270 is a guide of the upper ring gear 71, extruded from the upper surface of the lower ring gear 64, and is shaped so as to let the upper ring gear 71 rotate concentrically with the lower ring gear 64.

The tape guide assembly 75 is pivoted on the outside of the upper ring gear 75, and in loading the tape, the ring gear 75 rotates clockwise, and stops after the tape guide assembly 75 contacts the tape guide position 16.

Similarly, another tape guide assembly 69 is pivoted on the inner side of the lower ring gear 64, and in loading the tape, the ring gear 64 rotates counterclockwise, and stops after the tape guide assembly 69 contacts the tape guide position 15.

Installation of the lower ring gear 64 and the upper ring gear 71 on the chassis S is performed as follows.

At first, insert the tip portions of the lower ring gear 64 into the space portion 25 while holding the gear 64 approximately rectangular to the bottom surface of the chassis S, then turn towards this side, then the lower ring gear 64 is inserted under the rib portion 17. Next, place the ring gear 64 on the ring gear placing portion 65, so that the inner side of the inner ring gear 64 contacts the rib 24 of the chassis S upwardly, extruded as being shaped in circular arc. For installing the upper ring gear 71, place concentrically the upper ring gear 71 on the lower gear 64 C so as to be guided by the guide 270 shaped on the lower ring gear 64 and by the guide 24 shaped in the chassis S.

Next, the seventh embodiment according to this invention is described in detail with reference to FIG. 12 to FIG. 14 as follows.

As show in FIG. 12, numeral 71 is the upper ring gear, numeral 83 is an upper sliding plate corresponding to the first sliding plate, numeral 82 is a lower sliding plate placed under the upper sliding plate 83 and corresponds to the second sliding plate. Numeral 87 is a tension spring bridged between the upper sliding plate 83 and the lower sliding plate 82.

Figure 14:
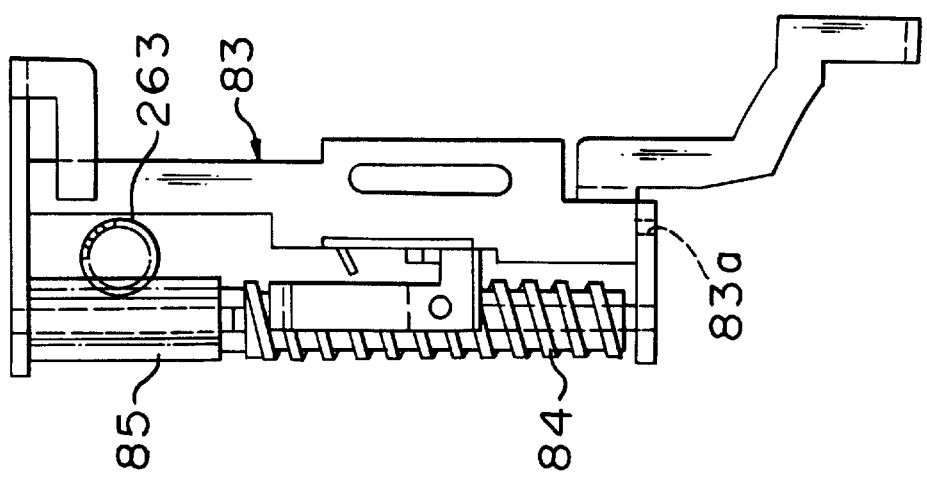
FIG. 14 is a plan view of an upper sliding plate according to one embodiment of this invention.

As shown in FIG. 14, in the upper sliding plate, a worm wheel 85 is driven by a worm 263 (shown in FIG. 10), then a worm gear 84 installed coaxially with the worm wheel 85, and the lower ring gear 64 engaged with the worm gear 84 is driven counterclockwise.

Further as the tension spring 87 is bridged between the upper sliding plate 83 and the lower sliding plate 82, then the upper sliding plate 83 biases the lower ring gear 64 towards the direction of arrow A, and the lower sliding plate 82 biases the upper ring gear 71 towards the direction opposite arrow A.

Figure 13:
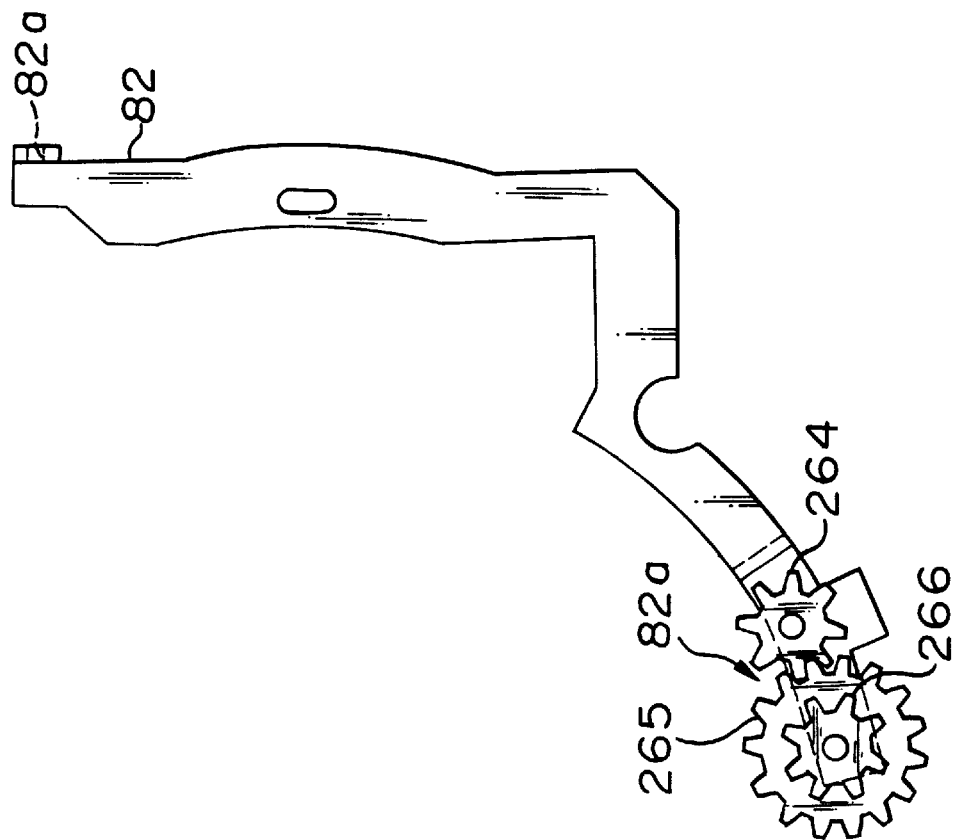
FIG. 13 is a plan view of an under sliding plate according to one embodiment of this invention.

Now, as shown in FIG. 13, an upper ring gear driving portion 82a is constructed with the first gear 264 engaged with the lower ring gear 64, the second gear 265 engaged with the first gear 264, and the third gear 266 shaped in one piece with the second gear 265 and engaged with the upper ring gear 71, then according to the counterclockwise rotation of the lower ring gear 64 driven by the worm gear 84, the first gear 264 rotates, then the third gear 266 also rotates, and the upper ring gear 71 rotates clockwise.

In FIG. 7, numeral 69 is the tape guide assembly, pivoted on the lower ring gear 64, and the guide roller 69a is installed on the assembly.

Similarly in FIG. 8, numeral 75 is the tape guide assembly pivoted on the upper ring gear 71, and the guide roller 75a is installed on the assembly.

Furthermore, each of the guide rollers 69a, 75a stop at the notches 79a, 79b of the catcher 79 at each of the end points of the revolution of ring gears 64 and 71.

However, as the worm gear 84 is designed to rotate as much as specified angle after the ring gears 64 and 71 stop, then the worm gear 84 engaged with the lower ring gear 64 advances while engaging with the stopped ring gear 64. Accordingly, the upper sliding plate 83 removes from the ribbed portion 88 of the chassis S, then the upper sliding plate 83 elastically pushes the lower ring gear 64 engaged with the worm gear 84 and the upper ring gear 71 engaged with the upper ring driving portion 82a towards the opposite direction through the tension spring 87 bridged between the upper and lower sliding plates 83 and 82. In consequence, the guide rollers 75a and 69a installed on the upper ring gear 71 and the lower ring gear 64 elastically contact the notches 79b and 79a of the catcher 79. Therefore, the guide rollers 75a and 69a are stably positioned, and the tape runs around the revolving head cylinder H at a certain angle.

Numeral 83a in FIG. 14 is a hook portion of the spring 87 on the upper sliding plate 83, and numeral 82a in FIG. 13 is a hook portion of the spring 87 on the lower sliding plate 84.

Figure 15A:
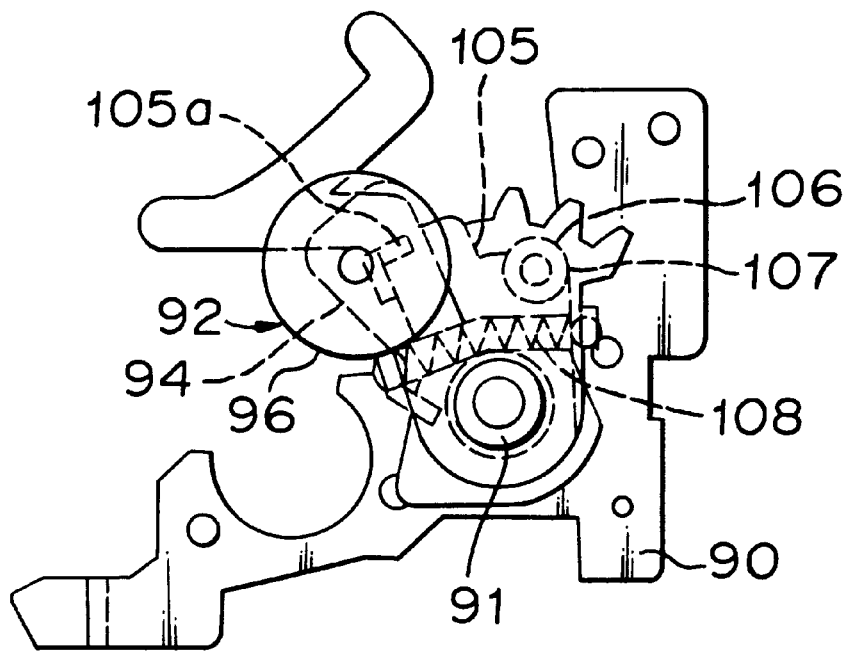
FIG. 15(a) is a plan view showing the pinch roller and associated elements according to one embodiment of the invention.

The eighth embodiment according to this invention is next described with reference to FIGS. 6, 15 and 16 as follows.

This embodiment relates to a construction which decreases the force loaded on the ring gears.

Figure 16:
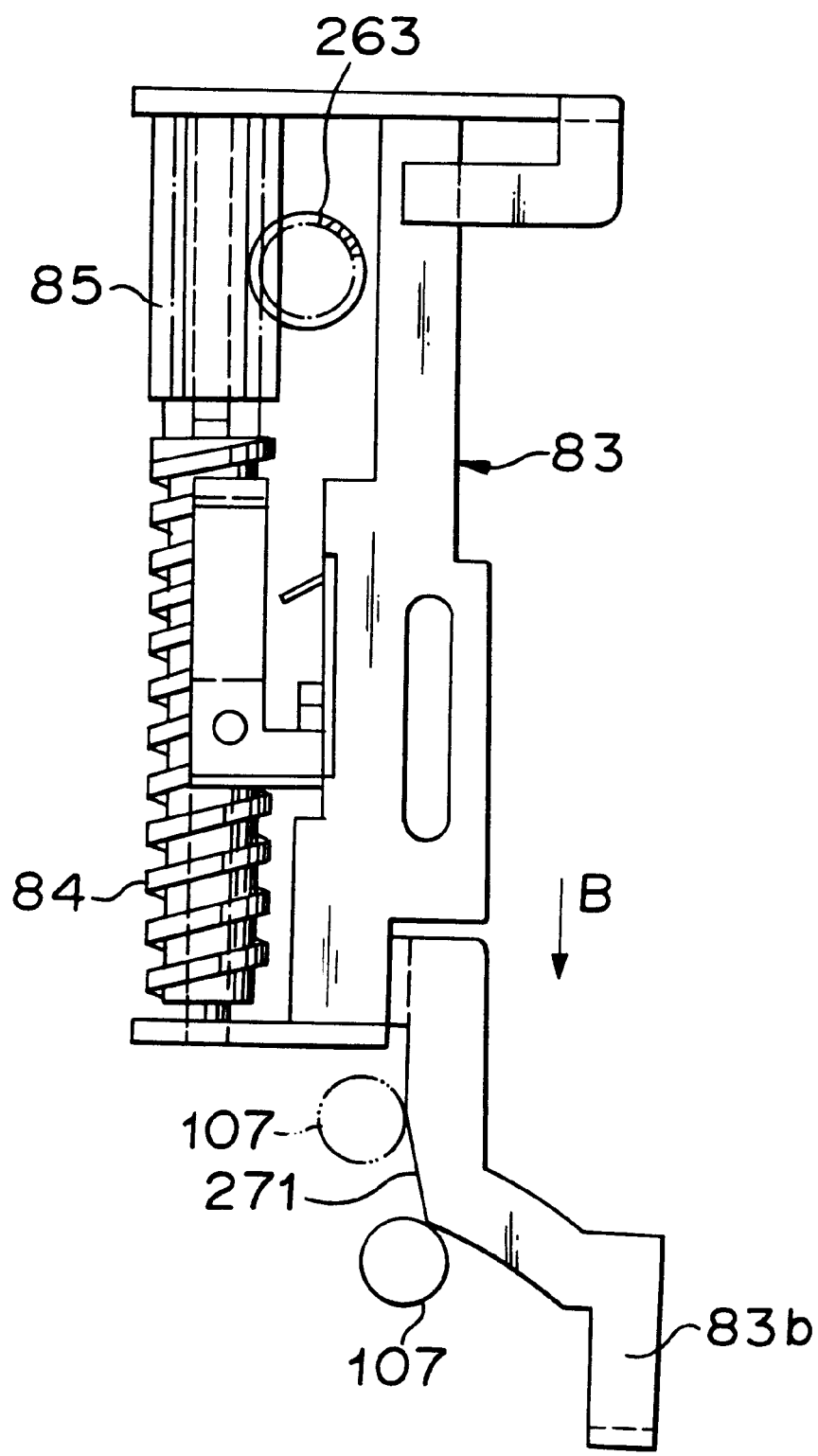
FIG. 16 is a plan view of the sliding plate according to one embodiment of this invention.

In FIG. 16, numeral 83 is an upper sliding plate. A worm wheel 85 is driven by the worm 263 (shown in FIG. 10), then the worm gear 84 coaxial with the worm wheel 85 is also driven, the lower ring gear 64 engaged with the worm wheel 85 rotates counterclockwise when loading the tape, and stops at the terminal point, but after that gear stops, the worm wheel 84 is designed to rotate as much as specified revolution.

Accordingly, as the worm wheel 84 advances despite stopping the lower ring gear 64, the slide plate 83 is forced to move towards the direction indicated by arrow B.

Numeral 83b is an operating lever integrated in one piece with the sliding plate 83 and extended before the worm gear 84, and an inclined portion 271 is shaped along the one side of the operating lever 83b. Accordingly, when the slide plate 83 advances towards direction B, the roller 107 installed on the first rotating plate 105 (shown in FIG. 15(a)) moves along the inclined portion 271 from the position 107 encircled with real line to the position 107 encircled with imaginary line.

Figure 15B:
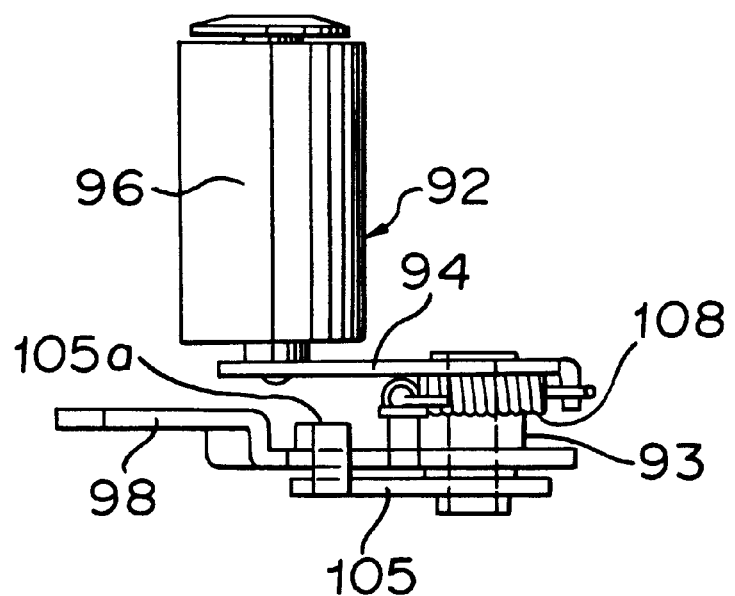
FIG. 15(b) is a side elevational view.

According to the movement of the roller 107, the pinch roller 96 (shown in FIG. 15(b)) energetically contacts the capstan (not shown).

In FIG. 15, numeral 91 is a fixed shaft installed on a reinforced plate 90 fixed on the chassis S, and a pinch boss 93 is rotatably installed in the fixed shaft 91.

Numeral 92 is a pinch roller sub-assembly, and the revolving end of a second revolving plate 94 is fixed to the pinch boss 93, and the pinch roller 96 is rotatably installed on the tip of the revolving plate 94f.

Numeral 98 is an under pinch arm fixed to the pinch boss 93 at the position lower than that of the second revolving plate 94, and rotating together with the plate 94.

The base end of a first revolving plate 105 is rotatably pivoted to the pinch boss 93, and a stopper 105a shaped on the tip is positioned so as to contact the one end of the under pinch arm 98.

Also, a fixed roller shaft 106 is installed on the first revolving plate 105, and a roller 107 is rotatably inserted on the shaft 106.

Numeral 108 is a tension spring bridged between the first revolving plate 105 and the second revolving plate 94, and biased in the condition that the stopper 105a of the first revolving plate 105 contacts to the under pinch arm 98.

As above described, when the roller 107 moves while being pressed by the upper sliding plate 83, the first revolving plate 105 on which the roller 107 is installed, rotates counterclockwise around the pinch boss 93, while the under pinch arm 98 revolves simultaneously towards the same direction, then the pinch roller 96 contacts the capstan (not shown), When the pinch roller 96 contacts the capstan, then the tension spring 108 is extended, and the pinch roller 96 is forced to contact the capstan as being biased by the tension spring 108.

By applying the above mentioned construction, as the reaction of the pinch roller 96 is not applied to the worm gear 84, then it becomes possible to make the lower ring gear 64 with resin such as plastic.

The ninth embodiment according to this invention is next described in detail with reference to FIGS. 6, 7 and 17 as follows.

Figure 17:
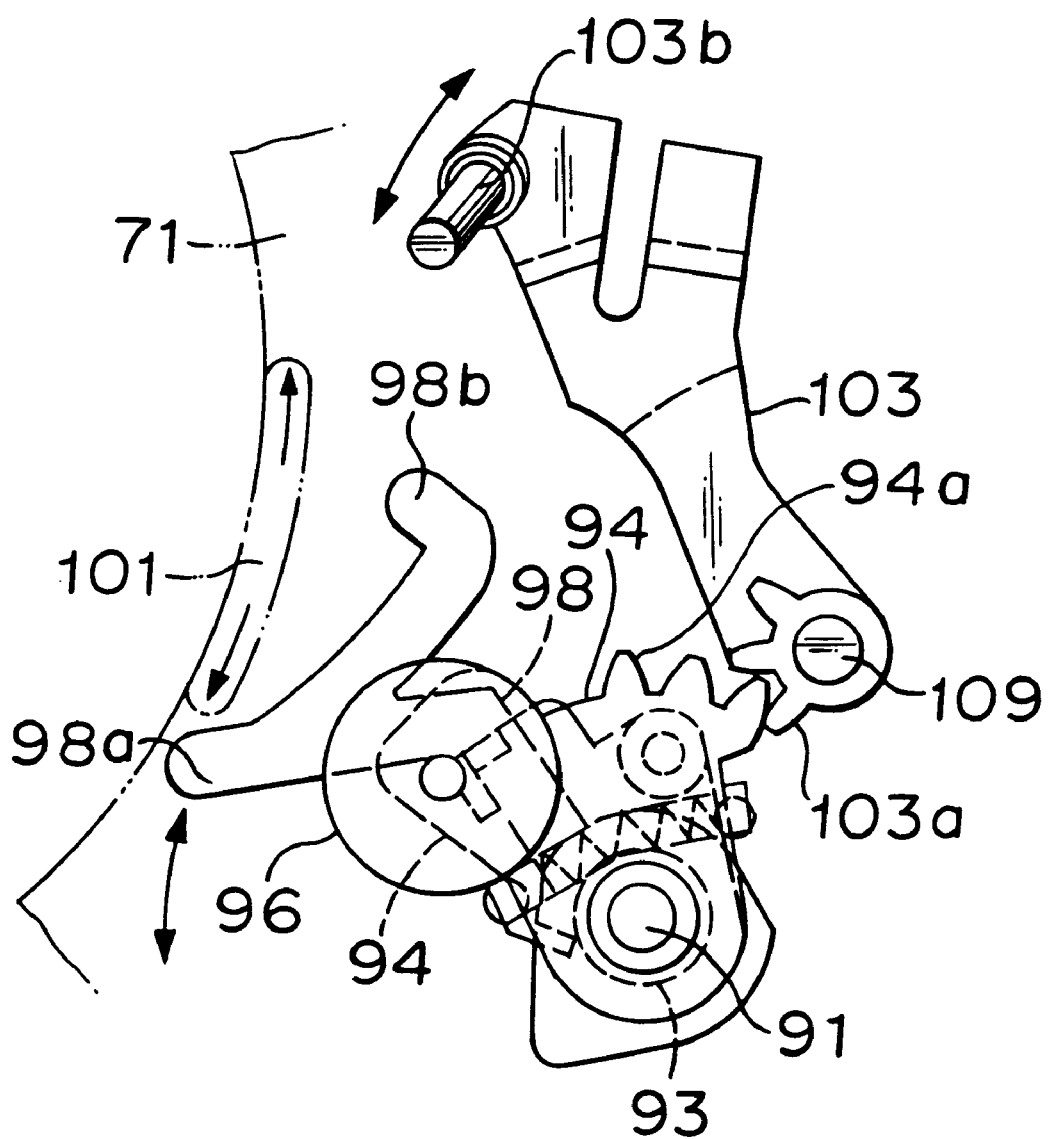
FIG. 17 shows plan views of an inclined post arm, a pinch arm driving the post arm and an arm under the pinch roller.

This embodiment is characterized in that an inclined post 103b shown in FIG. 17 is moved to the specified position by applying a rib 101 shaped on the upper ring gear 71.

The upper ring gear 71 revolves clockwise when loading the tape, and revolves counterclockwise when unloading the tape. As shown in FIGS. 8 and 17, a circular rib 101 is shaped on the upper surface of the ring gear 71.

Also in FIG. 17, a fixed pin 91 equivalent to the revolving center of an under pinch arm 98 and a pinch arm 94 and another fixed pin 109 equivalent to the revolving center of an inclined post arm 103 are installed on the reinforcing plate 90 (shown in FIG. 15) and the plate 90 is fixed on the chassis S.

The under pinch arm 98 and the pinch arm 94 are fixed to a pinch boss 93, and the boss 93 is placed on the fixed pin 91 and the pinch arm 94 is located over the under pitch arm 98.

Accordingly, both arms 98 and 94 simultaneously rotate around the fixed pin 91.

Both tips 98a and 98b of the T-shaped under pitch arm 98 are alternatively able to contact with the circular rib 101 of the upper ring gear 71. Accordingly, when loading the tape, an engaging tip 98a engages with one end of the rib 101, and when unloading the tape, another engaging tip 98b engages with the other end of the rib 101.

Further, a fan-shaped gear 94a is shaped in one piece with the pitch arm 94, and the fan-shaped gear 94a engages with the other fan-shaped gear 103a shaped coaxially and in one piece with the inclined post arm 103, then the inclined post arm 103 rotates according to the rotation of the under pitch arm 98.

Accordingly, as the inclined post arm 103 rotates to the specified position by the rotation of the upper ring gear 71, then an inclined post 103b installed on the inclined post arm 103 guides the tape to the specified position.

Figure 18A:
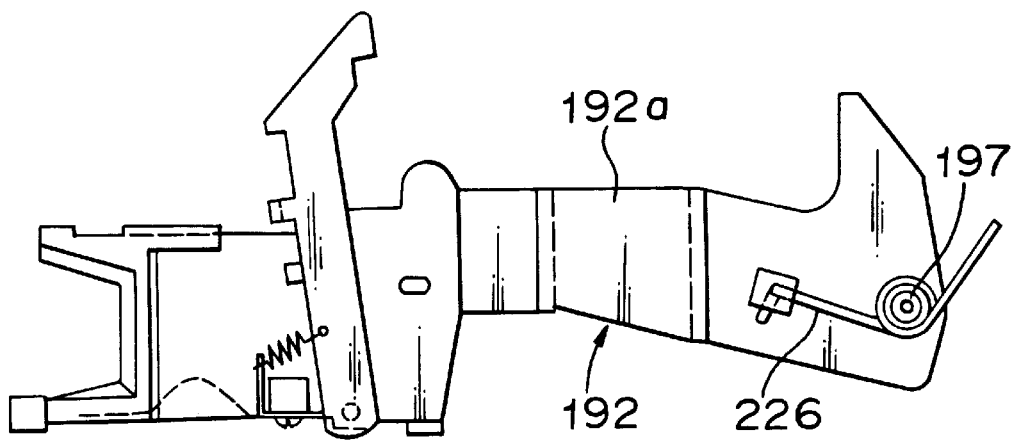
FIG. 18(a) is side elevational view of a cassette holder according to one embodiment of the invention.
Figure 18B:
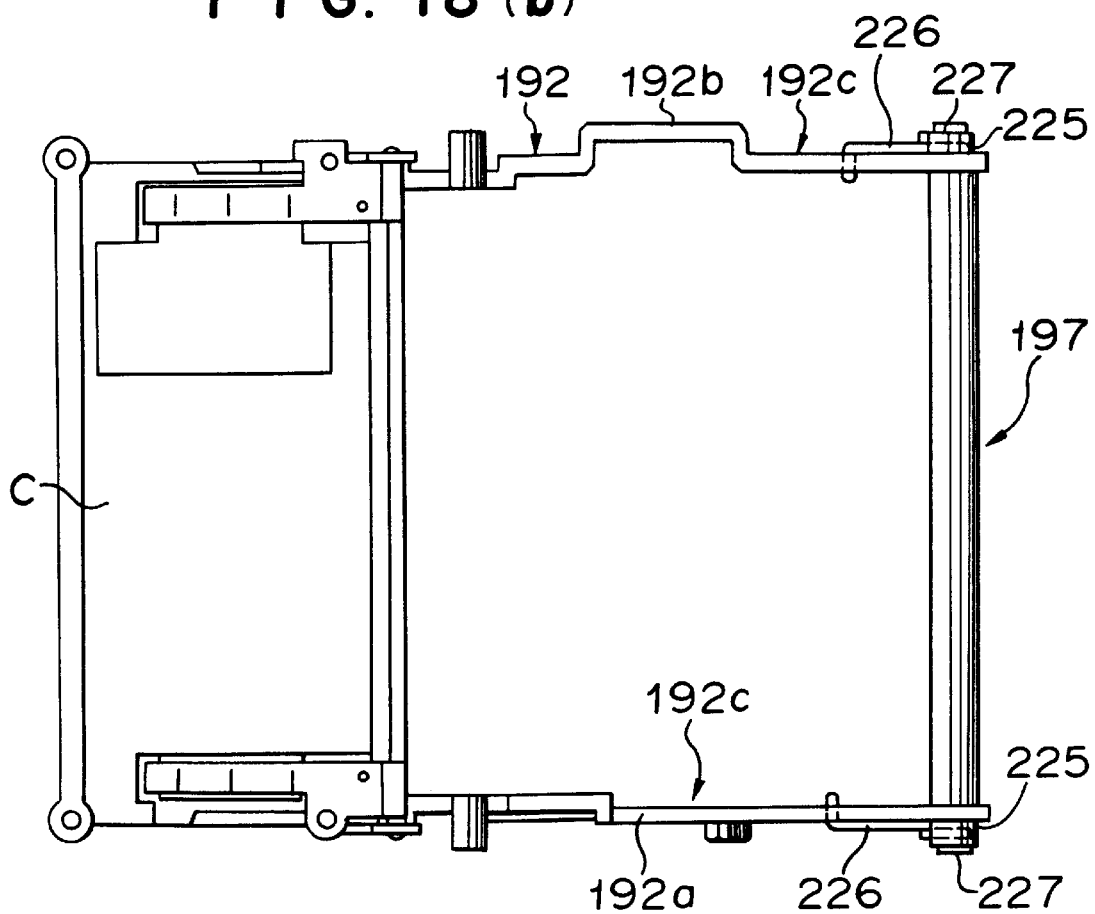
FIG. 18(b) is plan view thereof.
Figure 19:
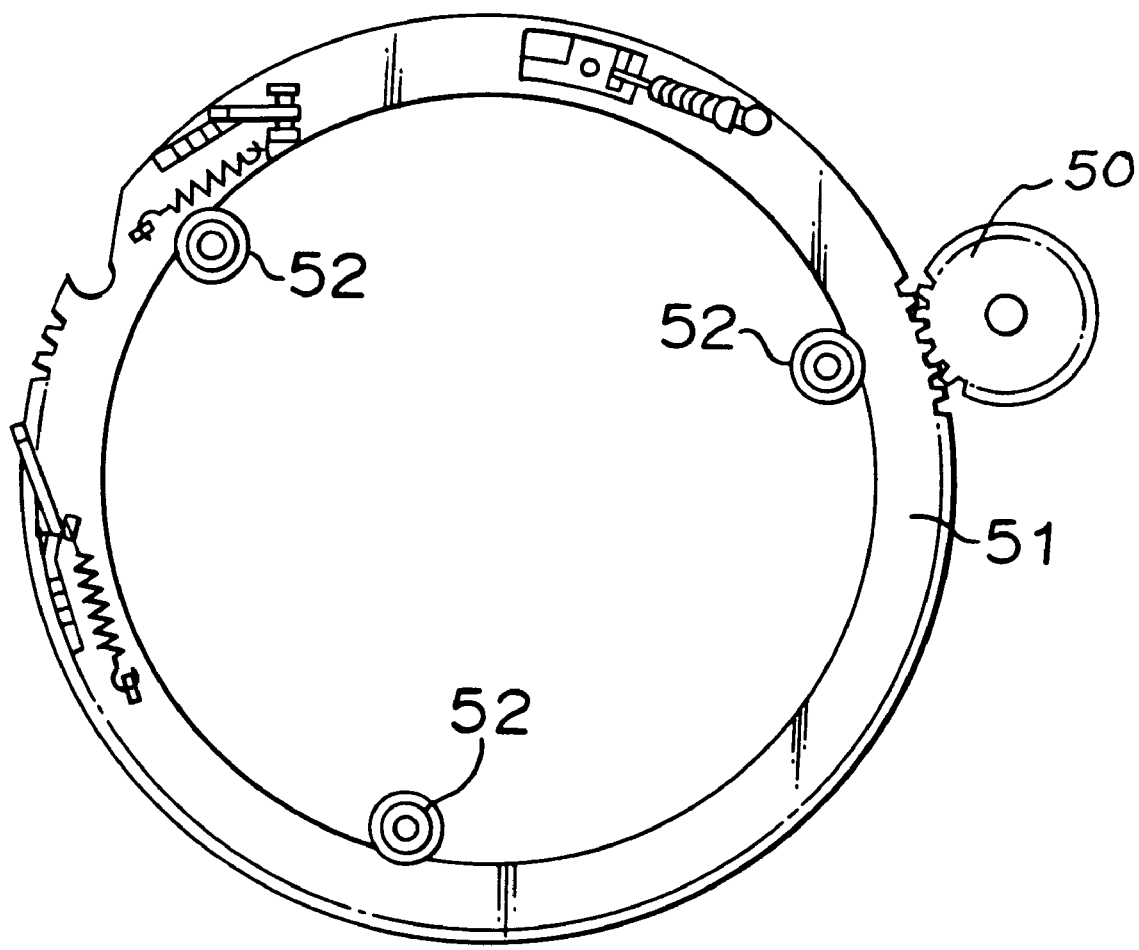
FIG. 19 shows a plan view of a conventional ring gear.
Figure 20:
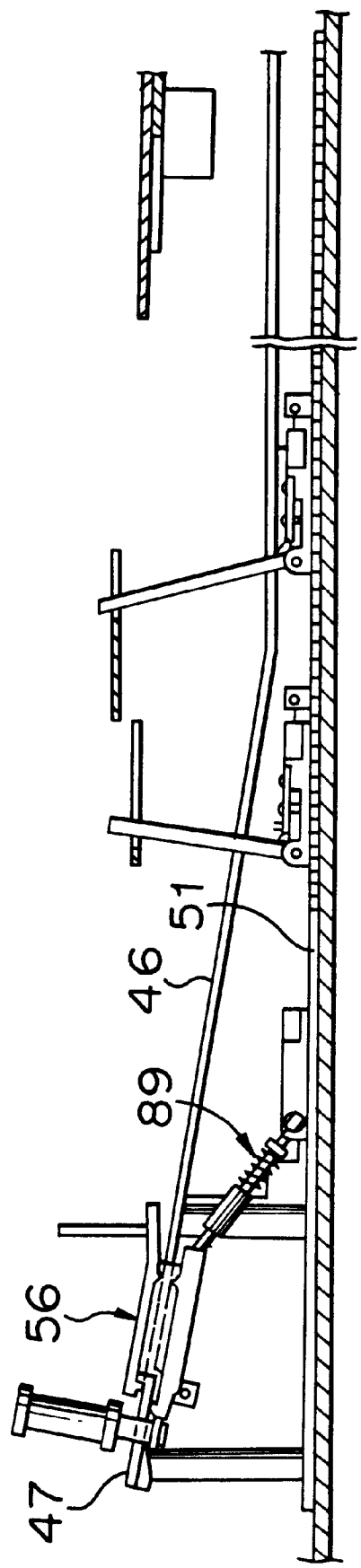
FIG. 20 is a sectional side elevational view showing the relation between a ring gear against conventional guide assembly, and conventional guide rail.

Finally, the embodiment relating to the construction of the cassette holder is described in detail with reference to FIGS. 3, 4 and 18 as follows.

In FIG. 3, numeral 192 is the cassette holder and numeral 19 is a synchronizing shaft installed on the cassette holder 192.

The cassette holder 192 is made of resin (for example, PPS resin), further side portions 192a and 192b are elongated and shaped pair of door hinges 192c.

At the rear ends of the door hinges, the synchronizing shaft 197 for connecting the rear ends is installed so as to be rotatable around the axis.

Further, on both sides of the shaft 197, a pair of first extended portions 225 is shaped, and a pair of springs 226 are mounted on the extruded portions 225 for biasing the cassette holder to open.

Further, the second extruded portions 227 are shaped on the tips of the first extruded portions 225, and the second extruded portions are inserted into the supporting holes 197a of the chassis S. Accordingly, the cassette holder 192 is rotatably supported on the chassis S.

In assembling the cassette holder 192 into the chassis S, the second extruded portions are guided along the inclined guide grooves 231 shaped above the support holes 197a of the chassis S.

After assembly, the cassette holder 192 is set by applying set screws 232 as shown in FIG. 4.

By applying these constructions, when the cassette holder is opened, together with setting the cassette into the cassette housing chamber C, shut the cassette holder 192 by pushing down the surface 192d of the cassette holder 192.

In this case, as the cassette holder was rigidly shaped, it is possible to rotate the cassette holder without causing any bending or twisting, even if manipulated at any position of the upper surface 192d of the cassette housing chamber C.

No doubt, it is possible to make the synchronizing shaft 197 in one piece with both side portions 192a and 192b.

What is claimed is:

1. A magnetic tape recorder and/or play back device comprising:

a frame;

a chassis supported by said frame;

a rotary head cylinder mounted in said chassis;

a lower ring gear and an upper ring gear coaxially provided on said chassis;

a motor mounted on said chassis and driving to rotate said lower ring gear and said upper ring gear;

a first tape guide fixed to said lower ring gear;

a second tape guide fixed to said upper ring gear; and first and second guide receiving portions provided in association with said lower ring gear and said upper ring gear and receiving said first tape guide and said second tape guide respectively, whereby rotation of said lower ring gear and said upper ring gear facilitate loading of the tape onto the rotary head cylinder;

a worm gear with which said lower ring gear is engaged, and a first slidable plate supporting said worm gear and slidable in a predetermined direction; a second slidable plate slidable in said predetermined direction; a further gear provided on said second slidable plate and engageable to said lower ring gear; and a spring bridged between said first slidable plate and said second slidable plate; wherein when rotation of said lower ring gear and said upper ring gear are stopped, said first slidable plate is slid to said predetermined direction according to a rotation of said worm gear to slide said second slidable plate in said predetermined direction, whereby said further gear is adapted to further rotate said lower ring gear.

2. A magnetic tape recorder and/or play-back device as claimed in claim 1, wherein said further gear includes a first gear engaged to said lower ring gear, a second gear engaged to said first gear, and a third gear coaxial and integrally formed with said second gear.

3. A magnetic tape recorder and/or play-back device as claimed in claim 1, wherein said second gear rotates more slowly than said first gear.

* * * * *